(12) United States Patent
Sato et al.

(10) Patent No.: US 7,342,602 B2
(45) Date of Patent: Mar. 11, 2008

(54) POLARIZATION MEANS AND ITS POSITION HOLDING MECHANISM

(75) Inventors: Seiji Sato, Kanagawa (JP); Hidehiko Sekizawa, Tokyo (JP)

(73) Assignee: Sony Corporation (JP)

( * ) Notice: Subject to any disclaimer, the term of this patent is extended or adjusted under 35 U.S.C. 154(b) by 828 days.

(21) Appl. No.: 10/676,018

(22) Filed: Oct. 2, 2003

(65) Prior Publication Data

US 2004/0135740 A1  Jul. 15, 2004

(30) Foreign Application Priority Data

Oct. 11, 2002 (JP) ............................ P2002-298120

(51) Int. Cl.
*H04N 9/47* (2006.01)
*C09K 19/02* (2006.01)

(52) U.S. Cl. ........................................ 348/59; 349/176

(58) Field of Classification Search ................. 348/59, 348/832, 42, 51, 54; 349/176; 359/464; 345/32

See application file for complete search history.

(56) References Cited

U.S. PATENT DOCUMENTS

| | | | |
|---|---|---|---|
| 4,740,073 A | | 4/1988 | Meacham |
| 5,076,665 A | * | 12/1991 | Petersen ..................... 359/809 |
| 5,537,144 A | * | 7/1996 | Faris ........................... 348/58 |
| 5,644,427 A | * | 7/1997 | Omori et al. ............... 359/464 |
| D383,121 S | * | 9/1997 | Sebastian ................... D14/114 |
| 6,222,672 B1 | | 4/2001 | Towler et al. .............. 359/465 |
| 6,333,773 B1 | * | 12/2001 | Faris ........................... 349/176 |
| 6,377,295 B1 | * | 4/2002 | Woodgate et al. .......... 348/59 |
| 6,417,894 B1 | * | 7/2002 | Goff et al. .................. 348/832 |
| 6,703,989 B1 | * | 3/2004 | Harrold et al. .............. 345/32 |

FOREIGN PATENT DOCUMENTS

| | | |
|---|---|---|
| JP | 59-210436 | 11/1984 |
| JP | 03-092817 | 4/1991 |
| JP | 05-257082 | 10/1993 |
| JP | 10-177349 | 6/1998 |
| JP | 11-234704 | 8/1999 |
| JP | 11-295654 | 10/1999 |
| JP | 11295654 | 10/1999 |
| JP | 2002-082307 | 3/2002 |
| JP | 2002-196281 | 7/2002 |
| WO | WO-9500872 | 1/1995 |
| WO | WO 9500872 | * 1/1995 |

OTHER PUBLICATIONS

PTO Form 1449 filed Feb. 6, 2004 in corresponding U.S. Appl. No. 10/656,843-Considered by Examiner Mar. 14, 2006.
PTO Form 982 in corresponding U.S. Appl. No. 10/656,843 issued by the Examiner Mar. 14, 2006.
Office Action dated Apr. 27, 2007 in corresponding U.S. Appl. No. 10/656,843.

* cited by examiner

*Primary Examiner*—Gims Philippe
(74) *Attorney, Agent, or Firm*—Rader Fishman & Grauer LLC; Ronald P. Kananen

(57) ABSTRACT

This invention provides a polarization means capable of obtaining an always clear three-dimensional image easily, correctly, and quickly and a position holding mechanism. A polarizing plate has areas for the left eye and the right eye where respective polarized lights separated by a first half wave plate enter. A second half wave plate for rotating the polarized lights in a direction opposite to that of the first half wave plate is disposed on an image display surface side for the right eye side area of the polarizing plate. A polarizing plate fixture with an arm part for holding the polarizing plate in a predetermined position is also provided.

30 Claims, 21 Drawing Sheets

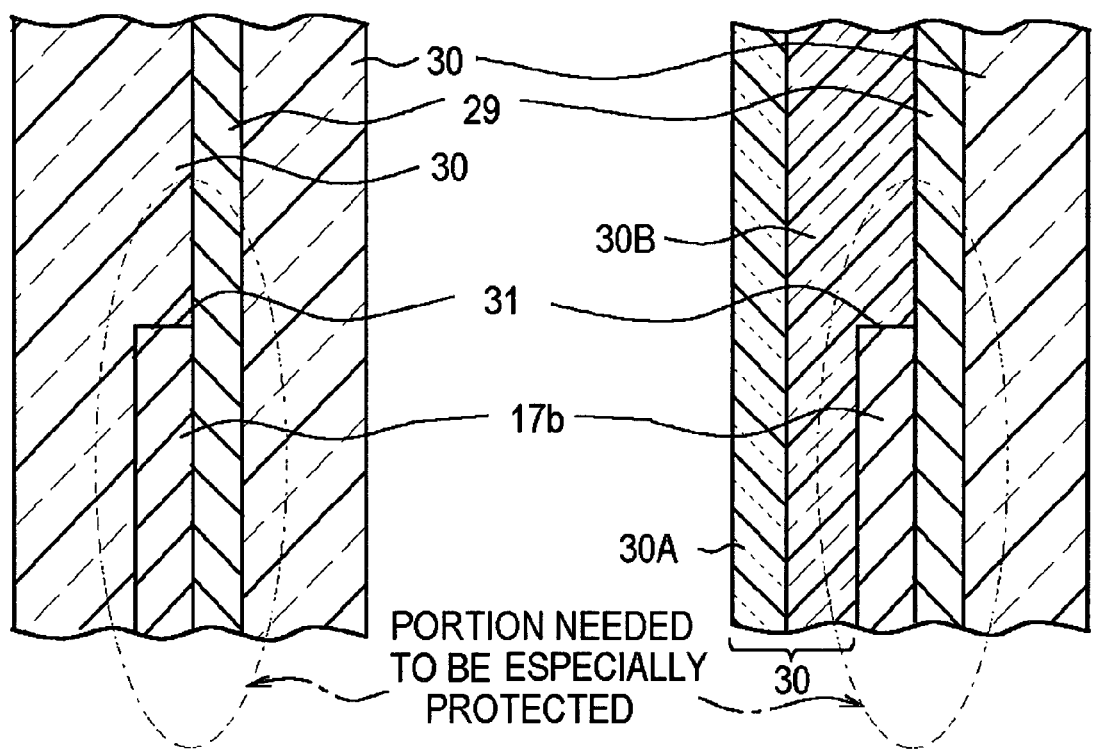

(IMAGE DISPLAY SURFACE SIDE)

ROTATE DIRECTION (IMAGE DISPLAY SURFACE SIDE)

17b
(IMAGE DISPLAY SURFACE SIDE)

(VIEWER SIDE)
17b

PRIOR ART

PRIOR ART

PRIOR ART ent JP2002-298120, filed in the Japanese Patent
POLARIZATION MEANS AND ITS POSITION HOLDING MECHANISM

CROSS REFERENCE TO RELATED APPLICATIONS

The present document is based on Japanese Priority Document JP2002-298120, filed in the Japanese Patent Office on Oct. 11, 2002, the entire contents of which are incorporated herein by reference.

BACKGROUND OF THE INVENTION

1. Field of the Invention

The present invention relates to a polarization means suitable for observing three-dimensional image information and its position holding mechanism.

2. Description of Related Art

Conventionally, various technological attempts have been made to realize a three-dimensional image display. In many fields of treating images, such as photographs, movies, and television, image display methods relating to three-dimensional images have been studied and put into practical use.

The image display methods relating to the three-dimensional images are classified roughly into a glasses system and a non-glasses system. In either system, images with parallax are separately received by the right and left eyes of a viewer, respectively, so as to be seen as three-dimensional images. Among these, as typical examples of the glasses system, there are a so-called anaglyph system in which a pair of red and blue filtered glasses are worn and a polarized-glasses system.

Color separation systems, such as the anaglyph system, have many disadvantages in quality, such as difficulty of expressing color, degradation of a field of view, etc. Further, the polarized-glasses system suffers from the problem that it is generally necessary to use two projection apparatuses. However, a system allowing a three-dimensional image display with a direct vision type image display device has been proposed in these years.

An outline of a three-dimensional image display apparatus using the polarized-glasses system is shown in FIG. 18.

A three-dimensional image display apparatus 65 has a structure including a liquid crystal panel section 59 and a wavelength division plate filter 64 attached to the liquid crystal panel section 59. In the liquid crystal panel section 59, a pair of transparent support substrates 74a and 74b are provided between a polarizing plate 106, which has a polarization angle illustrated diagonally upward to the left, and a polarizing plate 96, which has a polarization angle illustrated diagonally upward to the right. A liquid crystal image display section 75 having a plurality of sets of pixel parts (red) 78R, pixel parts (green) 78G, and pixel parts (blue) 78B is provided between the pair of transparent support substrates 74a and 74b.

The wavelength division plate filter 64 is provided in front of the liquid crystal panel section 59. For example, a wavelength division plate (half wave plate) 76 for changing the polarization direction is disposed on one side (back) of a transparent support substrate 74c for every other horizontal line of the pixel sequence of the image display section 75 (note that, although the drawing shows several of them in the interests of brevity, in fact many plates are provided, and the same applies to the following wave length division plate filter 64). The wavelength division plate filter 64 is also referred to as a "micro pole" or a "micro polarizer".

According to the three-dimensional image display apparatus 65 of a such structure, the direction of a linear polarized light, which is emitted forward in a predetermined direction from the liquid crystal panel section 59, is rotated by 90 degrees due to an action of the wavelength division plate filter 64, so that respective linear polarized lights from odd lines and even lines of a display screen are changed to be in the mutually orthogonal direction.

In other words, for example, as for the odd lines, the linear polarized lights are emitted as they are, without changes, from the liquid crystal panel section 59. On the other hand, as for the even lines, the linear polarized lights directed in the direction orthogonal to the linear polarized lights from the odd lines are generated by the action of the wavelength division plate filter 64.

Each of such polarized lights is observed by means of polarizing plates 69 (for example, a pair of polarized glasses) that are disposed in the proximity of a viewer's eyes. In other words, the polarizing plates 69 have a polarizing plate member 57R which has a polarization angle illustrated diagonally from the lower left to the upper right and a polarizing plate member 57L which has a polarization angle illustrated diagonally from the lower right to the upper left and orthogonal to that of the former, in which the right eye 72R receives a polarized light of an image for the right eye through the polarizing plate member 57R and the left eye 72L receives a polarized light of the image for the left eye through polarizing plate member 57L. By observing both images through the polarizing plates 69 in this way, the viewer can observe a three-dimensional image in full color without flickering.

However, when the wavelength division plate filter 64 is mounted and built into the three-dimensional image display apparatus 65, its installation must be reliably fixed in a position corresponding to a predetermined area (pixel position) of the three-dimensional image display apparatus 65, which is not easy, and the following problems may arise.

In other words, one of the problems is that the image display system is a system in which an image display surface is divided into the predetermined areas, so that it is necessary to render the divided areas of the image display surface as fine as possible, in order to obtain a higher resolution.

Since a finer pixel part for the image display surface has been developed according to a demand for higher image resolution, the liquid crystal panel section 59 of a high definition image display surface having fine division areas is available. However, producing the high definition wavelength division plate filter 64 corresponding to this by means of another separate process and accurately mounting and securing a division pattern of the wavelength division plate filter 64 corresponding to a division pattern (i.e., predetermined pixel parts) of the image display surface are very difficult.

Even if it is possible to mount and fix the wavelength division plate filter 64 accurately, the fixation is generally performed by means of adhesion, such as resin adhesives, for example, so that displacement tends to occur during curing the resin or before it is set, even if it is once adjusted to temporary positioning. Further, it is often the case that displacement of the wavelength division plate filter 64 occurs because of several factors, such as vibration during conveyance and heat.

As to the quality of the material of the wavelength division plate filter 64, it is often the case that a heavy glass substrate is generally used in order to maintain accuracy at the time of being mounted at the predetermined areas, and due to a problem in its production, the glass substrate tends to be displaced because of its own weight. In addition, due to the conditions of durability, such as degradation of a fixing material, the wavelength division plate filter 64 may be displaced. Once displacement of the cured fixing material occurs, it is sometimes very difficult to correct the position, so that it may become impossible to use the costly liquid crystal panel section 59, which is wasteful.

Further, as to the three-dimensional image display apparatus 65, when observing the three-dimensional image, it is necessary to determine the optimal position of the wavelength division plate filter 64 according to conditions such as the positions and height of both eyes of a viewer. There is still another problem that the position of the wavelength division plate filter 64 fixed in advance is not always the optimal position when in observation.

Due to the above factors, if the wavelength division plate filter 64 is displaced with respect to the image display section 75 by several percent to a few tens percent (for example, about a few tens of micrometers), the displacement may partially mix optical information data with one another among the pixel part 78R, 78G and 78B and cause cross talk, thus being amplified and observed.

When the wavelength division plate filter 64 is installed in the correct position, each of the corresponding lights from the respective pixel parts 78R, 78G and 78B always passes through a corresponding wavelength division plates 76 or a corresponding space between the wavelength division plates 76, and the lights do not interfere mutually.

However, when the wavelength division plate filter 64 is fixed in inclined attitudes, if this displacement amount is as small as several percent to a few tens percent with respect to the sizes of the pixel parts 78R, 78G and 78B, or if an absolute value of the displacement is about 50 micrometers, perpendicular displacement amounts at both sides of the liquid crystal panel section 59 are further increased, so that the lights from the respective corresponding pixel parts 78R, 78G and 78B may not pass through only the corresponding wave plate 76 or only the corresponding space between the wave plates.

As a result, the cross talk in an image occurs among the respective pixel parts 78R, 78G and 78B (among the lines, here), thus suffering from the problem that a good three-dimensional image cannot be displayed.

As shown in FIG. 19, a three-dimensional image display apparatus, as in a prior application, includes a notebook computer 60 having attached thereto a liquid crystal panel section 59 that is openable/closable and the wavelength division plate filter 64 that can be attached to the liquid crystal panel section 59, for example.

The notebook computer 60 has the liquid crystal panel section 59 in a liquid crystal image display section 84 which has a foldable structure, so that an image including parallax may be displayed by the liquid crystal panel section 59. The liquid crystal panel section 59 itself may be one that is used for the image display section of a usual notebook computer. For example, when an application for displaying a three-dimensional image is not in operation, it is possible to display the usual images (video image, still image, etc.).

Disposed on the front side facing the liquid crystal panel section 59 is a keyboard section 88 including keys suitable for inputting an alphanumeric character, a hiragana character, a katakana character, etc. and various control keys, etc. Being integral with the keyboard section 88, a palm rest section 87 is provided on a viewer's side. A pointer pad section 86 is provided in the central part of this palm rest section 87.

The keyboard section 88 side is connected to the liquid crystal panel section 59 through a hinge section 66, and the liquid crystal panel section 59 may pivot with respect to the hinge section 66. Therefore, the three-dimensional image viewer can adjust the angle of the liquid crystal panel section 59 by pivoting the hinge section 66 to a desired angle for comfortable viewing.

A position adjustment pattern display program is installed in a hard disk (not shown) of the notebook computer 60. The program is read into a central processing unit of the notebook computer 60 and executed so that a position adjustment pattern is displayed on the liquid crystal panel section 59.

A frame section 85 made of a synthetic resin, for example, is provided around the image display section 84. The computer 60 has a structure in which the liquid crystal panel section 59 is held by the frame section 85 at the image display section 84.

A protruding part 82, which is formed to protrude at a part of the frame section 85, is provided under the image display section 84. The protruding part 82 sufficiently protrudes so as to hold and be in contact with the bottom of the wavelength division plate filter 64. The image display section 84 is formed so as not to suffer from trouble when it is turned and folded up toward the keyboard section 88 side.

As described above, the wavelength division plate filter 64 is a polarization control section in which the wavelength division plates 76 in stripes are disposed every other horizontal line of the respective pixel parts 78R, 78G and 78B.

There is a case, as shown in FIG. 20A, where a spatial relationship between the image display section 75 and the wavelength division plate filter 64 may not be arranged correctly in the three-dimensional image display apparatus 65.

In this case, as for the relationship between the arrangement direction of the respective pixel parts 78R, 78G and 78B of the image display section 75 and the arrangement direction of the wavelength division plate 76, the wavelength division plate filter 64 having a plurality of wavelength division plates 76 may lean slightly, so that the amount dl of the perpendicular displacement may be several percent to a few tens percent of the pixel parts in size. For example, assuming that the pixel parts 78R, 78G and 78B have sizes of 250 micrometers, ⅕ thereof, which is about 50 micrometers, may be displaced.

As a result, some components of the lights from the pixel parts 78R, 78G and 78B may not pass through the corresponding predetermined wavelength division plates 76, so that cross talk may take place among the respective pixel parts 78R, 78G and 78B. It is necessary to inhibit such cross talk from generating in order to display the optimal three-dimensional image, which needs a position adjustment operation.

Thus, as shown in FIG. 21B, the wavelength division plate filter 64 is arranged in the correct position, and each wavelength division plate 76 is provided on a line constituted by the pixel parts 78R, 78G and 78B of the image display section 75 so as to overlap the line exactly, which can be carried out by monitoring a display pattern for position adjustment displayed on the image display section 75 via the polarizing plates 69.

Therefore, the lights from the pixel parts 78R, 78G and 78B can pass through corresponding predetermined portions of the wavelength division plate 76. At the same time, the lights from the pixel parts, except for specific pixel parts, may not pass through the wavelength division plates, so that any cross talk does not occur and a high definition three-dimensional image can be displayed.

Thus, the reliable position adjustment of the transparent support substrate 74c allows a real time position check, and the position adjustment also allows displaying the three-dimensional image without causing a cross talk, whereby the high definition wavelength division plate filter 64 can be used always in the optimal state, it is always possible to observe a three-dimensional image of high definition, and there is a high sensation of reality in the optimal state.

In addition, as for an image display of multi-screens, its resolution may be highly improved, thereby to provide an image display without any cross talk among the respective pixels 78R, 78G and 78B. Further, the position setting of the wavelength division plate filter 64 may be carried out by the viewer himself or herself. Thus, it is possible to understand the principle of the three-dimensional image display so that it may be employed for the education of image engineering. Still further, it provides an advantage that it is possible to save time and efforts for fixing in advance the position of the wavelength division plate filter 64 when shipping.

However, even if the wavelength division plate filter 64 is adjusted in the correct position as described above, there are still problems, as follows, As shown in FIG. 21, these will be described referring to the figure showing the condition of separation and incidence of lights in the structure of FIG. 18.

First, images 73R for the right eye and images 73L for the left eye are displayed for every other horizontal line on the image display section 75. Further, the polarizing plate 96 is provided on the viewer side of the image display section 75, which has the polarization angle diagonal from the lower left to the upper right illustrated by a virtual line.

Further, on the viewer side of the polarizing plate 96, a wavelength division area 76a which permits the light polarized in the direction diagonally upward to the right to pass therethrough without changing the polarization direction and a wavelength division area 76b which has a half wave plate having a function of polarizing a light by 90 degrees to a polarization direction diagonally upward to the left are provided so as to correspond to respective images on the image display section 75 in which the images 73R for the right eye and the images 73L for the left eye are alternately displayed in ever other horizontal lines.

In this structure, the viewer wears the polarizing plates 69 (for example, a pair of polarized glasses) including the polarizing plate members 57R and 57L having the polarization angle respectively adapted to the images 73R for the right eyes and the images 73L for the left eye which are in horizontal lines and arranged every other line, so that the images 73R for the right eye are received by the viewer's right eye 72R and the images 73L for the left eye are received by the left eye 72L independently so as to view the three-dimensional image.

In other words, the images 73L for the left eye through the wavelength division areas 76b on the even lines, the polarization angles of which are rotated by 90 degrees diagonally upward to the left by means of the half wave plates, can not be observed through the polarizing plate member 57R for the right eye which has the polarization angle diagonally upward to the right. Only the images 73R for the right eye through the wavelength division areas 76a on the odd lines whose polarization angles are in agreement can be observed.

On the other hand, the images 73R for the right eye through the wavelength division areas 76a on the odd lines, the polarization angles of which are orthogonal to the even lines, cannot be observed through the polarizing plates 57L for the left eye having a polarization angle diagonally upward to the left. The images 73L for the left eye through the wavelength division area 76b on the even lines, the polarization angles of which are rotated by means of the half wave plate by 90 degrees diagonally upward to the left, may be observed.

As to the polarizing plate member 57L for the left eye, the images 73R (odd lines) for the right eye, whose entry into the polarizing plate member 57L for the left eye is undesirable, are completely inhibited by the polarization angle of the wavelength division area 76a that permits the lights polarized by means of the polarizing plate 96 having the polarization angle diagonally upward to the right to pass therethrough as they are, which may not cause a problem that they enter the polarizing plate member 57L for the left eye.

However, as to the polarizing plate member 57R for the right eye, since the wavelength division area 76b made of the half wave plate whose polarization angle is rotated diagonally upward to the right has a wavelength dependence characteristic {(each rotation (polarization) angle differs from others depending on each wavelength)}, it is difficult to correctly polarize (rotate) every light in the whole visible light range by 90 degrees. Therefore, the images 73L for the left eye, whose entry to the polarizing plate member 57R for the right eye is undesirable, cannot be completely inhibited, so that some of the lights may leak and cause a cross talk.

Referring to FIG. 18, when the viewer observes the three-dimensional image with the right eye 72R and the left eye 72L via the polarizing plates 69, the viewer's observing angle and position with respect to the image display section 75 may often differ depending on the situation.

In this case, if the position of the wavelength division plate filter 64 is optimized and fixed by the above mentioned position adjustment mechanism, the angle and position of the polarizing plates 69 (for example, a pair of polarized glasses) change depending on conditions such as the viewer's seated height, so that the distance (space) and the degree of parallelism between the wavelength division plate filter 64 and the polarizing plates 69 may change and, further, a central position misalignment may happen.

Thus, it becomes difficult to hold the optimal distance between the wavelength division plate filter 64 and the polarizing plates 69. If the central positions of the wavelength division plate filter 64 and the polarizing plates 69 are misaligned, the entry amount of the polarization lights incident to each of the polarizing plate member 57R and 57L may decrease, the focuses of the lights incident to the left and right eyes may shift and it becomes difficult to carry out image focusing. In some cases, a cross talk, etc. may arise because of interference among incident lights, so that it becomes difficult to observe the three-dimensional image clearly.

In order to prevent the above described difficulties, the viewer himself/herself must adjust, each time, the polarizing plates 69 to the optimal distance and the optimal position with respect to the wavelength division plate filter 64, which takes time and effort and may cause poor adjustment.

In view of the above, the present invention provides a polarization means and a position holding mechanism with a polarizing plate which allow obtaining an always clear three-dimensional image easily, correctly and quickly.

SUMMARY OF THE INVENTION

In other words, the present invention relates to a polarization means that is used for a three-dimensional image display apparatus and that includes an image display section for displaying image information corresponding to parallax in a first region and a second region, a first phase retardation plate that is provided facing the first region and the second region of the image display section and rotates a polarization direction of a polarized light of the image information from the first region in a direction different from a polarization direction of a polarized light of the image information from the second region, and a second phase retardation plate having a first area and a second area which allow respective polarized lights separated by the first phase retardation plate to enter, the second phase retardation plate for rotating polarized lights in a direction opposite to that of the first phase retardation plate being provided in the first area or the second area on the image display section side, and further relates to a position holding mechanism including: the polarization means; and a position holding means for holding the polarization means at one end, holding a distance and parallelism between the polarization means and the first phase retardation plate, and aligning them.

According to the present invention, the polarization means has the first area and the second area which permit respective polarized lights separated by the first phase retardation plate to enter, and the second phase retardation plate for rotating polarized lights in a direction opposite to that of the first phase retardation plate is provided in the first area or the second area on the image display section side, so that lights that are emitted from the image display section side, passed through the first phase retardation plate, polarized in a predetermined polarization angle direction, and separated turn into lights polarized in a direction opposite to the predetermined polarization angle direction upon entry into the second phase retardation plate. Thus, the polarization angles of the lights are cancelled by the first phase retardation plate and second phase retardation plate, so that the lights are returned to those which have a polarization angle similar to that at the time they are emitted from the image display section side. Since the returned lights enter the first area or the second area, a clear three-dimensional image with little cross talk can be displayed.

In addition, the position holding mechanism is constituted so that the spatial relationship between the polarization means and the first phase retardation plate may be held. Since the position holding mechanism is provided, a distance (space), parallelism, and alignment between the first phase retardation plate and the polarization means can always be kept constant. Therefore, even if the angle of the polarization means, etc. changes, the distance, the parallelism, and the alignment between the polarization means and the first phase retardation plate do not change. Thus, the polarized lights from each region of the image display section may be entered respectively to the first area and the second area with a sufficient amount, completely separately, and without a focal blur, thereby obtaining an always clear three-dimensional image.

Further, because of the position holding mechanism which holds the spatial relationship between the polarization means and the first phase retardation plate, the viewer does not have to adjust the position of the polarization means by himself or herself, thereby observing a three-dimensional image comparatively easily and quickly.

BRIEF DESCRIPTION OF THE DRAWINGS

The above and other objects, features and advantages of the present invention will become more apparent from the following description of the presently preferred exemplary embodiments of the present invention taken in conjunction with the accompanying drawings, in which:

FIG. 2A is a perspective view showing a fixture having attached thereto a polarizing plate; and FIG. 2B is a partial perspective view in which a polarizing plate fixture is attached to an image display section;

FIG. 3A is a side view showing a state of the image display section having attached thereto the polarizing plate fixture; and FIG. 3B is a side view showing another state;

FIGS. 5A and 5B are partially enlarged sectional views showing the polarizing plate according to the embodiment of the present invention;

DESCRIPTION OF THE PREFERRED EMBODIMENTS

Figure 1A:
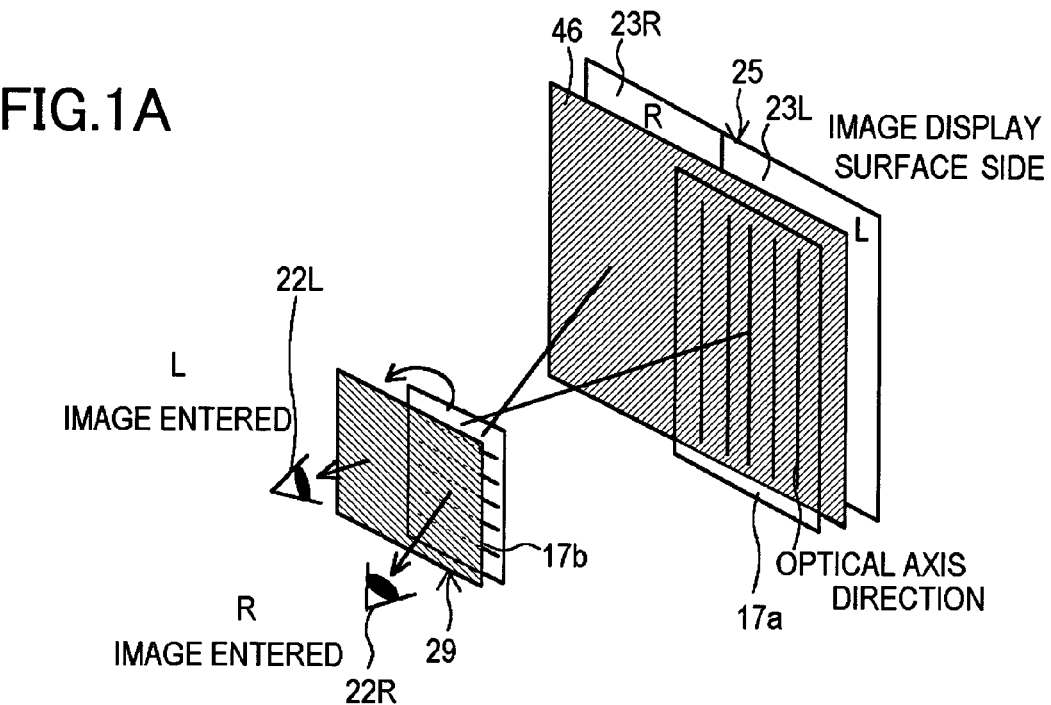
FIGS. 1A and 1B are perspective views schematically showing a structure of a three-dimensional image display apparatus according to an embodiment of the present invention.

In the present invention, it is preferable that the first phase retardation plate and the second phase retardation plate are made of half wave plates respectively and the respective polarized lights separated by the first phase retardation plate are allowed to enter the first area and the second area through or not through the second phase retardation plate.

Further, in order to protect the second phase retardation plate, it is preferable that at least a portion where the second phase retardation plate is located in the polarization means is coated with a transparent protection material.

In order to confirm the optimal observation position, it is preferable that a position of the polarization means may be changed so that a surface on the side where the second phase retardation plate is provided may face either a three-dimensional image observation side or the image display section side.

In order to hold the optimal observation position, it is preferable that the polarization means is held by the position holding means, which holds the distance and the parallelism between the first phase retardation plate and the polarization means and aligns them.

Further, in order to ensure the optimal observation position, it is desirable that the polarization means is attached so as to be detachable or undetachable from the position holding means or the position holding means is attached so as to be detachable or undetachable from the polarization means.

In addition, even if the angle of the polarization means, etc. changes by shifting the image display section, in order to hold the spatial relationship, it is desirable for the position holding mechanism to have the arm part which holds the polarization means at its one end and to be fixed to the frame section of the image display section at the other end.

In order to carry out position adjustment of the polarization means or move it to a position not in use, it is desirable that the position adjustment of the polarization means is performed by the click type position adjustment means provided in the arm part.

In order to alter position of the arm part comparatively easily, it is desirable that the other end of the arm part is fixed to the frame section (in particular, at its the upper part) of the image display section via the click type position adjustment means.

Further, in order to extend the position adjustment range of the polarization means or of the arm part by the position adjustment means provided in the position holding mechanism, it is desirable for the position adjustment means to have a mechanical angle adjustment mechanism for altering the position of the polarization means or of the arm part in the forward/rearward direction and/or in the left/right direction.

In particular, in order to perform comparatively easy position adjustment with the polarization means and a polarization direction conversion means, it is desirable for the polarization means to be turnable with respect to the polarization direction conversion means in the forward/rearward direction and/or in the left/right direction.

In order to facilitate the position adjustment between the polarization means and the polarization direction conversion means or to move the polarization means to a position not in use, it is desirable for the arm part to be stretchable in the forward/rearward direction.

In addition, the image display section may be constructed to be adjustable in angle.

It is preferable that the polarization means is held and fixed in front of the viewer so as to locate the first area and the second area at the left eye and the right eye, respectively.

The polarization means may be constituted as a pair of polarized glasses. In order to confirm the optimal observation position, the left and right of the polarization means may be reversed by altering the position of a holding and fixing section with respect to the viewer.

When the image display section is constructed to be adjustable in angle like a notebook computer, even if there is a change in angle thereof, the polarization means can be always arranged in a regular position easily and quickly by means of the position holding mechanism.

In addition, since the transparent protection material is coated on the surface of the polarization means, it is possible to protect the polarization means and improve the surface flatness.

Now, the preferred embodiments of the present invention will be described in particular, with reference to the drawings.

Figure 18:
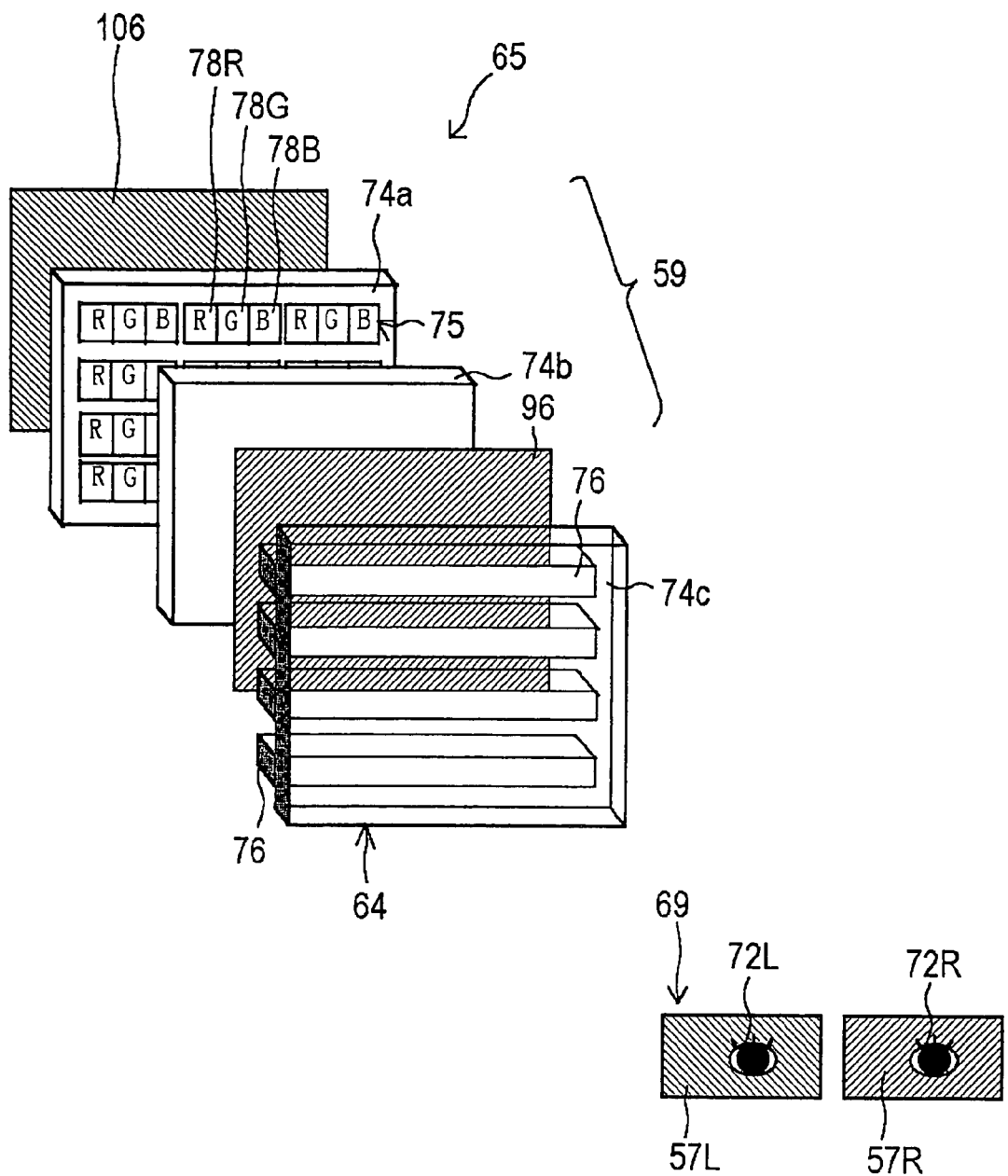
FIG. 18 is an exploded perspective view schematically showing a structure of a three-dimensional image display apparatus of a conventional example.

As to the embodiment as shown in FIG. 1A, in the three-dimensional image display apparatus 65 as shown in FIG. 18, a half wave plate 17a is disposed in an area corresponding to an image 23L for the left eye in the vicinity of a polarizing plate 46 (96 in FIG. 18). A half wave plate 17b is disposed on a side which faces the half wave plate 17a in an area corresponding to the right eye 22R of a polarizing plate 29 of a polarization angle (the same for both the left eye and the right eye) illustrated diagonally upward to the left, the polarizing plate 29 being disposed in the vicinity of the viewer.

In other words, disposed at the front side of an image display section 25 including the image 23L for the left eye and an image 23R for the right eye, which constitute a three-dimensional image, is the polarizing plate 46 having a polarization angle illustrated diagonally upward to the right. Further, disposed in a right half area on the viewer's side of the polarizing plate 46 is the half wave plate 17a, so that an optical axis is shifted by 45 degrees with respect to a polarization angle of the polarizing plate 46. The half wave plate 17a is schematically illustrated; however, it may be arranged in practice like the wavelength division plate 76 of FIG. 18.

Further, the polarizing plate 29 has the polarization angle illustrated diagonally upward to the left, and it is provided apart from the image display section 25 with a predetermined distance. For example, it is constituted as a pair of polarized glasses that the viewer wears. Disposed on the image display surface of the area portion of the polarizing plate 29 corresponding to the right eye 22R is the half wave plate 17b whose optical axis is orthogonal to that of the half wave plate 17a whose optical axis is perpendicular. Still further, in the image display section 25, bordering on the central part, the image 23L for the left eye and the image 23R for the right eye are respectively displayed on the right-hand side and on the left-hand side from the viewer side.

In FIG. 1A, the entry of the image 23R for the right eye into the left eye 22L of the viewer who observes images through the polarizing plate 29 is completely cut off, because the polarization angles of the polarizing plate 46 and the polarizing plate 29 are orthogonal to each other. On the other hand, the image 23L for the left eye can be observed, because the half wave plate 17a which is located between the polarizing plate 46 and polarizing plate 29 in an orthogonal state rotates the polarization angle of the image 23L by 90 degrees so that the polarization angles of the image 23L and the polarizing plate 29 are in agreement and the image 23L can be observed.

On the other hand, as to the viewer's right eye 22R, the polarization angle of the image 23R for the right eye is rotated by 90 degrees by the half wave plate 17b located between the polarizing plate 46 and polarizing plate 29 whose polarization directions are orthogonal to each other, so that the polarization angles of the image 23R and the polarizing plate 29 are in agreement and the image 23R can be observed.

Since optical axes of two half wave plates 17a and 17b, which exist between the polarizing plate 46 and the polarizing plate 29, are in the orthogonal state, phase differences are cancelled in a portion where the image 23L for the left eye must not enter the right eye 22R because the axes of coordinates are rotated by 90 degrees, whereby it seems as if phase retardation plates, such as two half wave plates 17a and 17b, do not exist.

Thus, the incident lights are completely cut off because of the polarization state (the orthogonal state) by means of the two half wave plates 17a and 17b. Therefore, as to the right and left eyes 22L and 22R, the image 23L for the left eye and the image 23R for the right eye may respectively enter the left eye 22L and the right eye 22R as completely independent lights without a cross talk, so as to display a clear three-dimensional image.

Figure 1B:
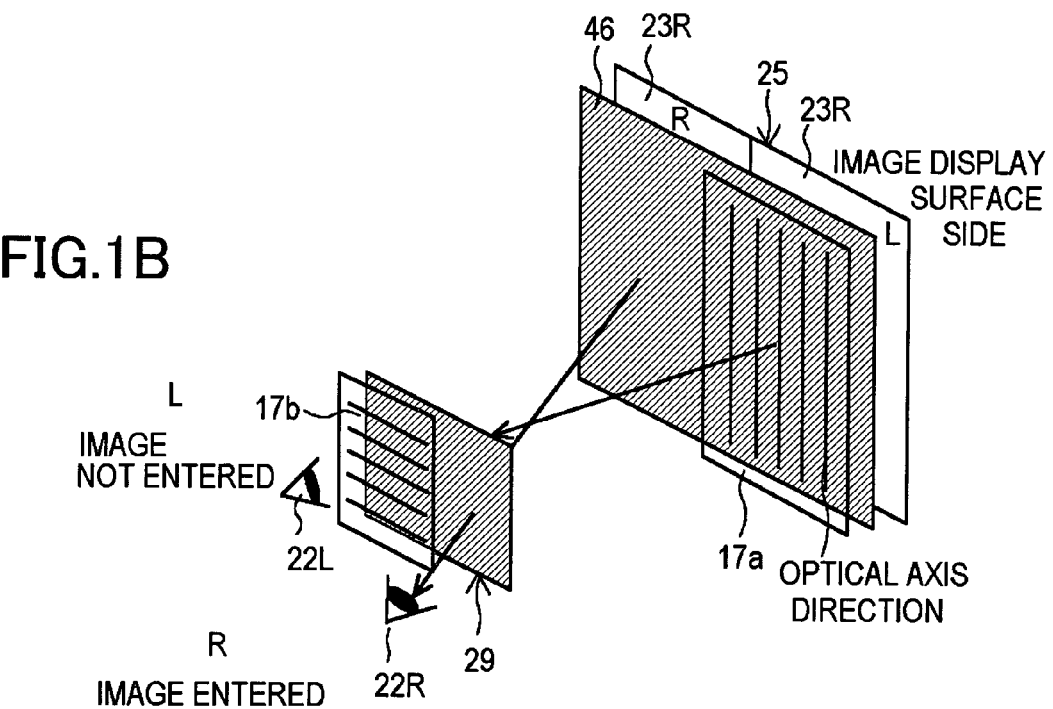

Next, when positioning the half wave plate 17a with respect to the image display section 25 before observing a three-dimensional image, the polarizing plate 29 having the half wave plate 17b in the area of the right eye 22R is rotated horizontally by 180 degrees, as indicated by an arc-shaped arrow from a state of FIG. 1A, to a state as shown in FIG. 1B, so that the half wave plate 17b can be located in the area of the left eye 22L on the viewer's side.

In this case, as to the left eye 22L of the viewer who observes the images through the polarizing plate 29, since the polarization angle of the polarizing plate 46 is similar to that of the polarizing plate 29, the entry of the image 23R for the right eye is allowed. Further, the polarization angle of the image 23L for the left eye is rotated by 90 degrees by means of the half wave plate 17a which is located between the polarizing plate 46 and the polarizing plate 29, so that the lights incident to the left eye 22L are substantially cut off.

On the other hand, as to the viewer's right eye 22R, the polarization angles of the polarizing plate 46 and the polarizing plate 29 are similar to each other, so that the image 23R for the right eye is allowed to enter. Further, the polarization angle of the image 23L for the left eye is rotated by 90 degrees by means of the half wave plate 17a which is located between the polarizing plate 46 and the polarizing plate 29, so that the image 23L is substantially inhibited from entering the right eye 22R.

Therefore, in the state of FIG. 1B, the image 23R for the right eye enters the right and left eyes 22L and 22R; however the image 23L for the left eye cannot. As a result, the right and left eyes 22L and 22R can simultaneously observe the two-dimensional image 23R for the right eye without displacement, so that a wavelength division plate filter 14 may be adjusted with both eyes opened in this state, whereby the position adjustment becomes easy and exact. Thus, even if the viewer is not good at the position adjustment with one eye closed, there is an advantage that he or she may only perform a comparatively simple operation, that is, a 180 degree rotation of the polarizing plate 29, so as to perform the position adjustment with both eyes opened.

For example, if the position adjustment of the half wave plate 17a (or wavelength division plate filter 14) is performed in the state of FIG. 1A, it is difficult to carry out the adjustment, because the image 23L for the left eye and the image 23R for the right eye, which are separated, respectively enter the right and left eyes of the viewer, so that position adjustment patterns on image display surfaces may be seen to overlap, which may be once cancelled by closing one of the eyes and seeing only with the other eye. However, it is not preferable for the viewer who is not good at closing one eye, and the adjustment itself is not so easy for the viewer.

Now, with reference to FIGS. 2A and 2B, a polarizing plate fixture 8 as the position holding mechanism according to the embodiment will be described.

According to this polarizing plate fixture 8, an attachment part 2 of a U-shaped attachment plate part 12 is fixed to an upper end part 11 of an image display section 34. A click type position adjustment part 3 is provided at the attachment plate part 12. The position adjustment part 3 has an integral arm part 4 and is connected through a click type position adjustment part 5 to a U-shaped attachment plate part 13 having an attachment part 1 for attaching thereto the polarizing plate 29 that is arranged in the proximity of the viewer's eyes.

The polarizing plate 29 having the polarization angle diagonally upward to the left is, for example, detachably fixed to the attachment plate part 13 at a top center position. Further, the half wave plate 17b is provided at the right eye side from the viewer's point on the image display surface side of the polarizing plate 29.

Figure 2A:
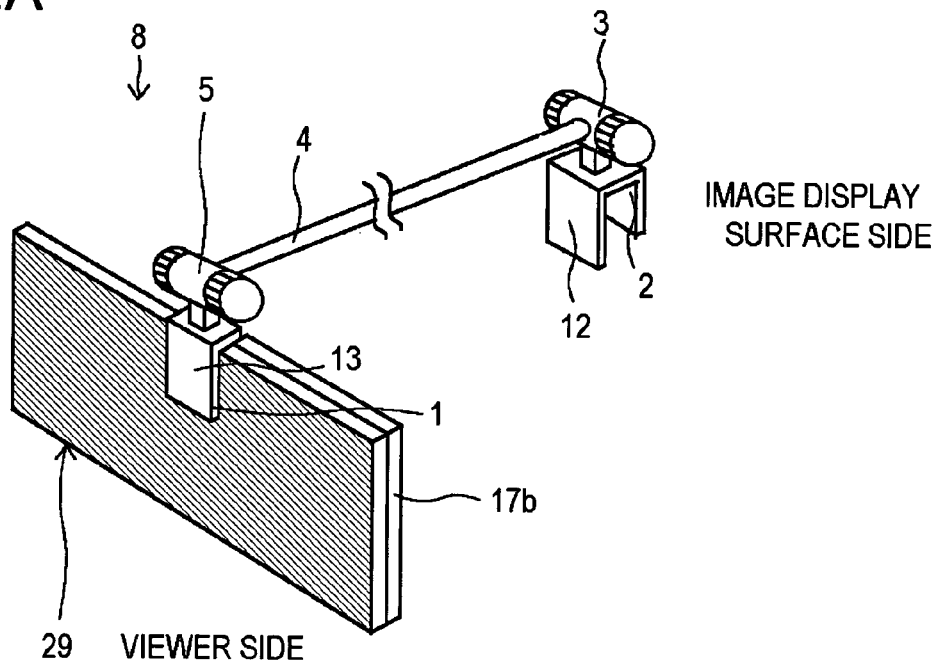
FIGS. 2A and 2B schematically show a structure of a three-dimensional image display apparatus according to another embodiment of the present invention.
Figure 2B:
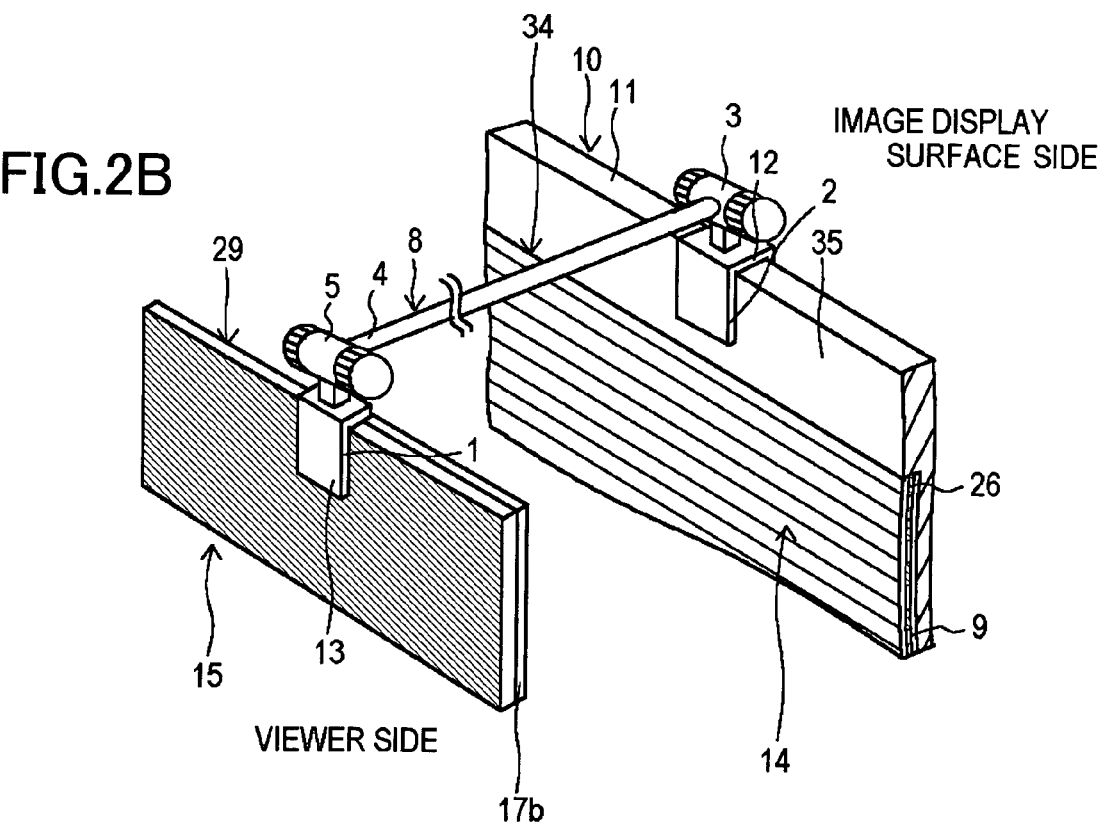
Figure 19:
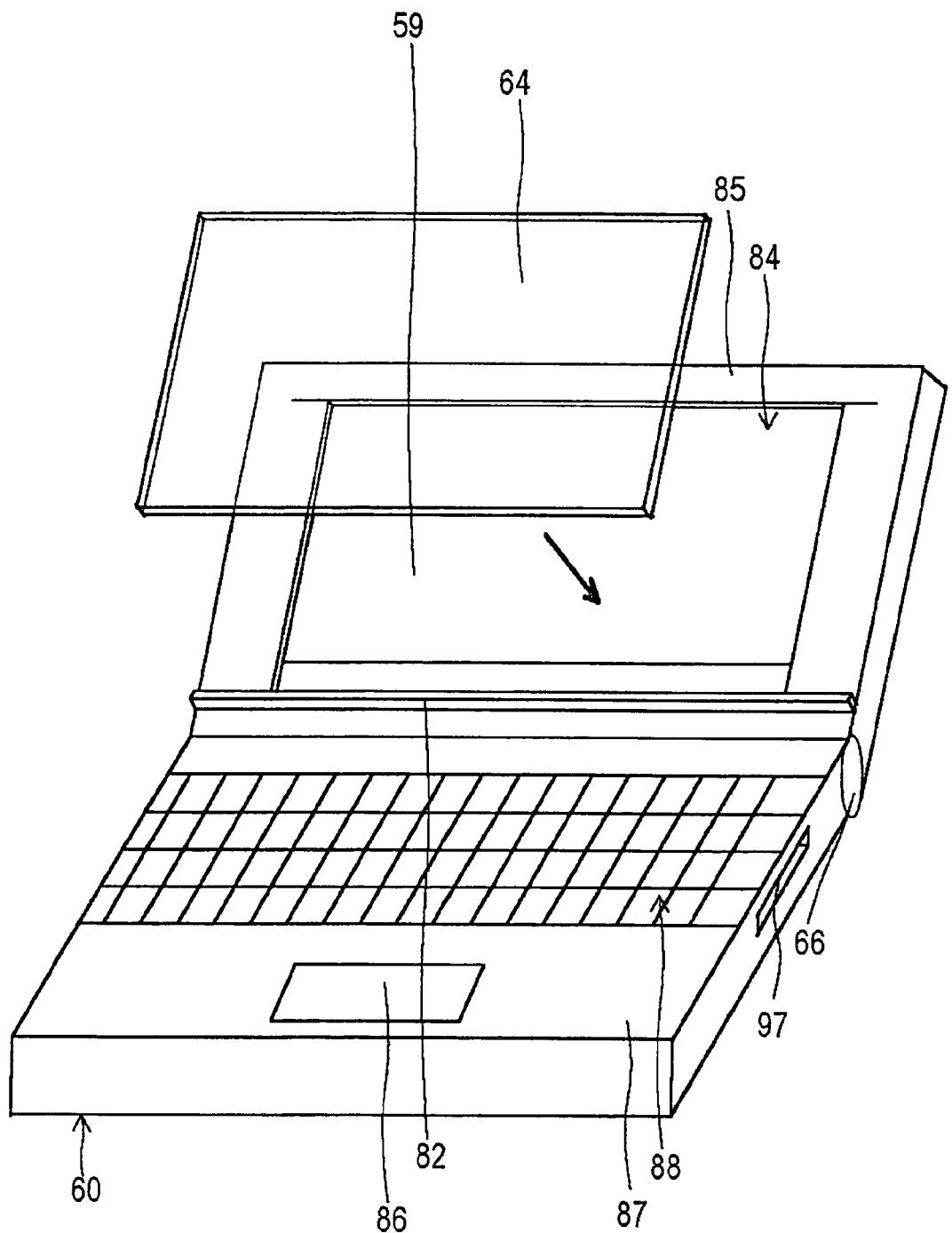
FIG. 19 is a perspective view in the case of installing a wavelength division plate filter in a notebook computer according to a conventional technology.
Figure 20A:
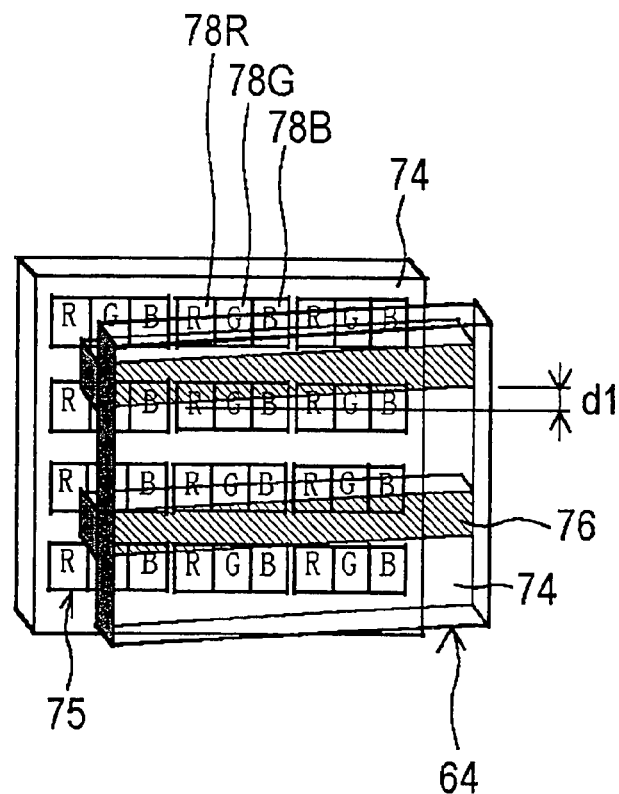
FIGS. 20A and 20B are perspective views showing a spatial relationship between an image display section and a wavelength division plate filter according to a conventional technology.
Figure 20B:
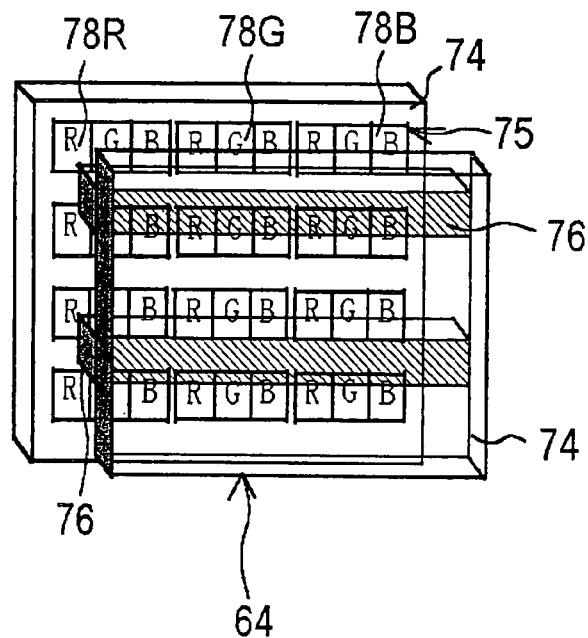
Figure 21:
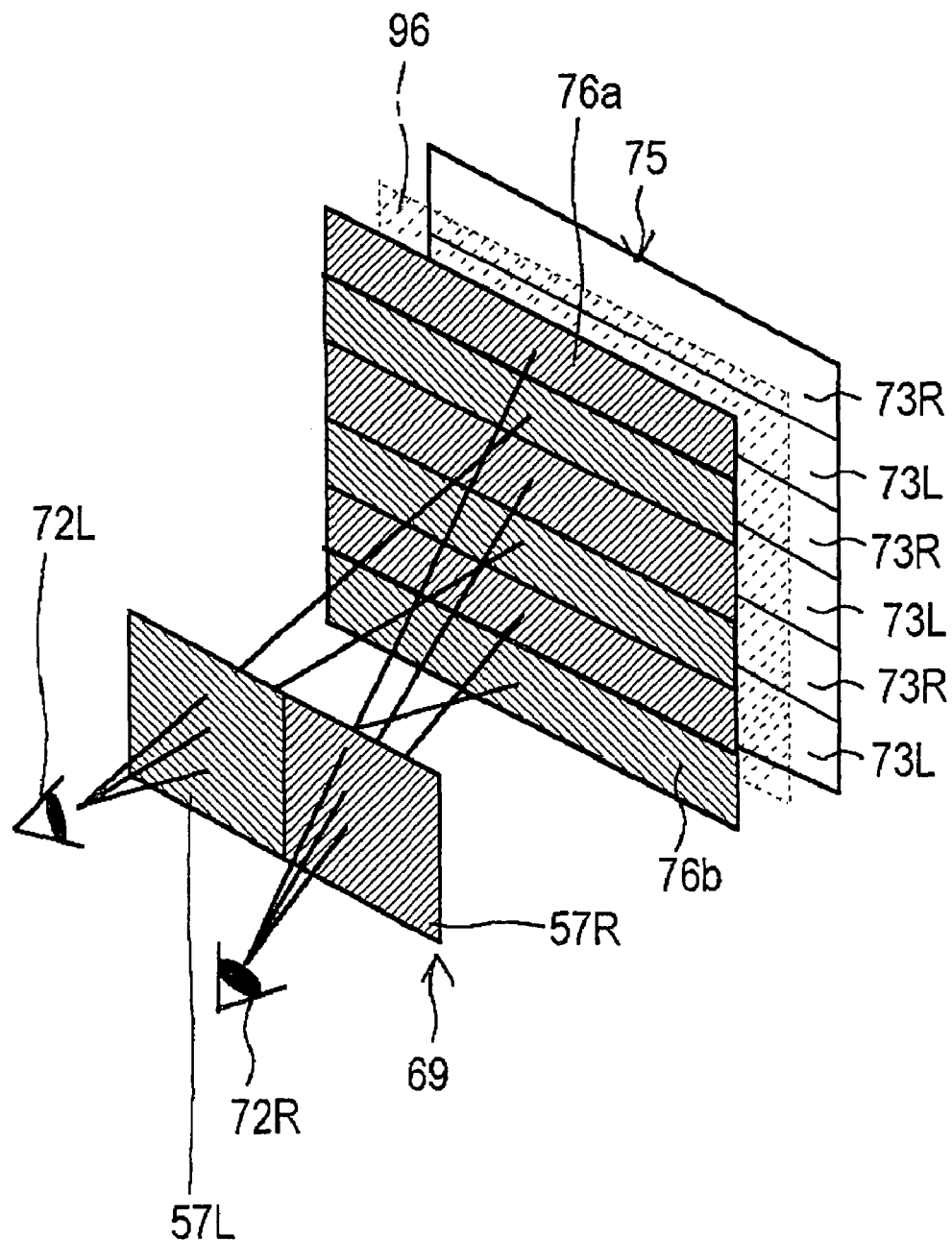
FIG. 21 is a perspective view schematically showing a structure of a three-dimensional image display apparatus according to a conventional technology.

Further, FIG. 2B shows a part of a notebook computer 10; as with FIG. 18 or FIG. 19, a liquid crystal image display section 34 having a liquid crystal panel part 9, the wavelength division plate filter 14 and a frame section 35 holding these are provided. At a center top end part 11 of the frame section 35, as described above, the attachment plate part 12 of the polarizing plate fixture 8 is fixed so that one end of the polarizing plate fixture 8 is secured.

As for the wavelength division plate filter 14, one equivalent to the wavelength division plate filter 64, as shown in FIG. 18 or FIG. 19, may be used. Reference numeral 26 in FIG. 2B denotes a wavelength division plate (half wave plate).

Further, in the embodiment, a three-dimensional image display apparatus 15 may be constituted by a combination of the image display section 34 having the wavelength division plate filter 14 and the polarizing plate 29; however, the one in which the polarizing plate fixture 8 having the polarizing plate 29 fixed to the frame section 35 may be referred to as the image display apparatus 15. One that has not been thus fixed but which may optionally fix the polarizing plate fixture 8 or the polarizing plate 29 thereto may be called the image display apparatus. Both are included in the concept of the present invention.

Figure 3A:
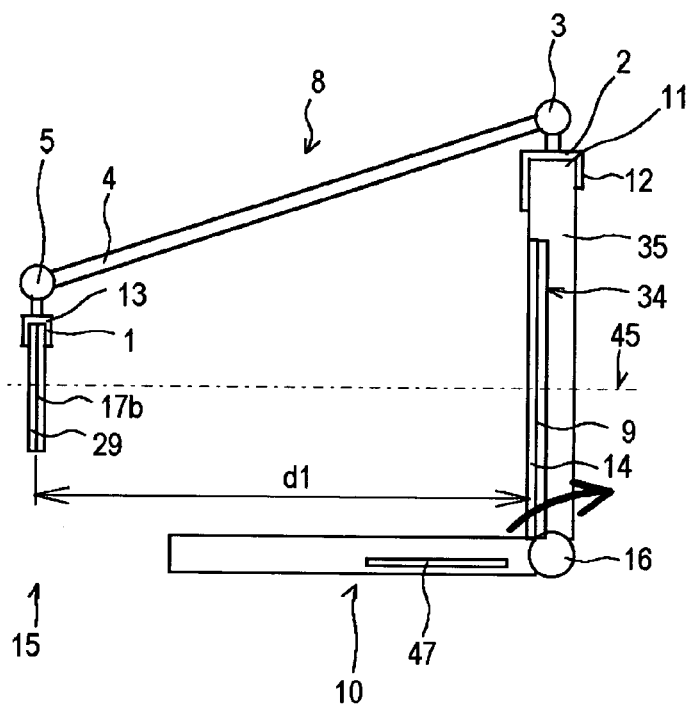
FIGS. 3A and 3B schematically show a structure of a three-dimensional image display apparatus according to the embodiment of the present invention.

FIG. 3A shows a state of the notebook computer 10 where the image display section 34 including the liquid crystal panel part 9, the wavelength division plate filter 14, and the frame section 35 is turned with respect to a hinge section 16 so as to stand straight.

In this state, by performing a click-like turning operation in the forward/rearward direction with respect to the position adjustment parts 3 and 5 of the polarizing plate fixture 8 fixed to the frame section 35 as described above, the angle adjustment between the arm part 4 and the polarizing plate 29 attached to the polarizing plate attachment plate part 13 is carried out, and the distance or the space between the polarizing plate 29 and the image display section 34 (i.e., the wavelength division plate filter 14) is held at a predetermined constant value d1 so as to secure the center alignment and the parallelism between them.

In other words, in this way, the distance and the parallelism between the polarizing plate 29 provided with the half wave plate 17b and the wavelength division plate filter 14 are held by the click operation easily, reliably and quickly, and they are aligned with a center line 45. Therefore, when the viewer observes the image display section 34 through the polarizing plate 29, he or she may observe an always clear three-dimensional image easily based on the principle as mentioned above. In addition, as for the position adjustment, the polarizing plate 29 or the arm part 4 may be turned not only in the forward/rearward direction (or in the upward/downward direction) but also in the left/right direction, or the arm part 4 may be made in a sleeve type, etc. so as to be stretched in the forward/rearward direction to adjust a length.

Figure 3B:
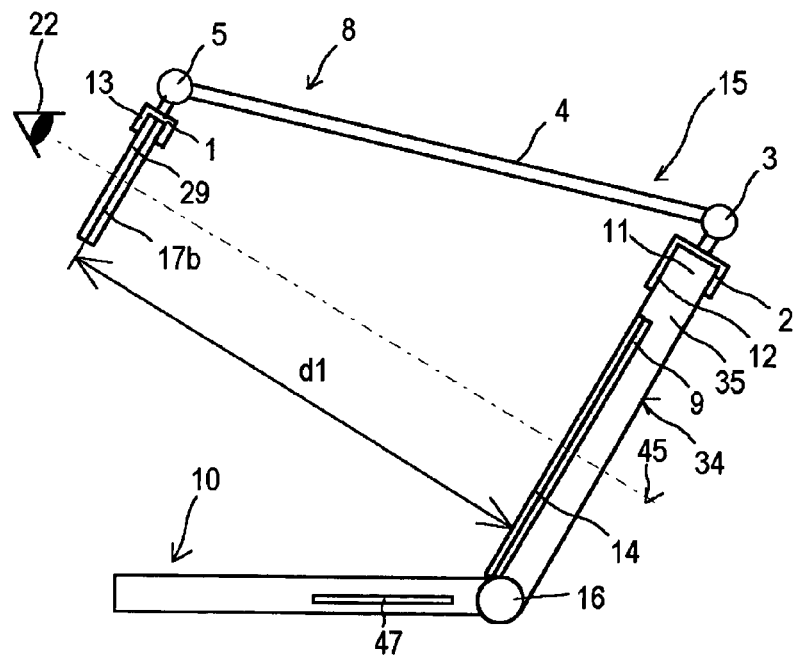

In this way, after holding the spatial relationship between the polarizing plate 29 and the wavelength division plate filter 14, as the position of the viewer's eyes 22 moves upward because of a change in the viewer's seated height, etc., for example, the image display section 34 is turned as indicated by an arc-shaped arrow in the state of FIG. 3A, so as to change and obtain a tilt angle as shown in FIG. 3B; however, as described above, when the viewer observes the images, the spatial relationship between the polarizing plate 29 and the wavelength division plate filter 14 already has been fixed so as to be in the optimal state, which is not different from the state of FIG. 3A, whereby the optimal position of the polarizing plate 29 may always be held, even if the image display section 34 changes in angle.

Therefore, the viewer can observe an always clear three-dimensional image easily and reliably even viewing the image display section 34 from any angle. The position of the polarizing plate 29 is set up and fixed once in early stages; if the image display section 34 changes in angle, it becomes unnecessary to correct the angle of the polarizing plate 29. Or, it is possible to adjust it in position easily by means of a click function, to thereby reduce time and effort for adjusting the position of the polarizing plate 29 each time the angle of the image display section 34 is changed.

In the state of FIG. 3A or FIG. 3B, it is possible to position the wavelength division plate filter 14 corresponding to a pixel sequence while monitoring a display pattern of the image display section 34 as described above. At the time of this position adjustment, it is natural to hold the spatial relationship between the polarizing plate 29 and the wavelength division plate filter 14, as described above.

Figure 4A:
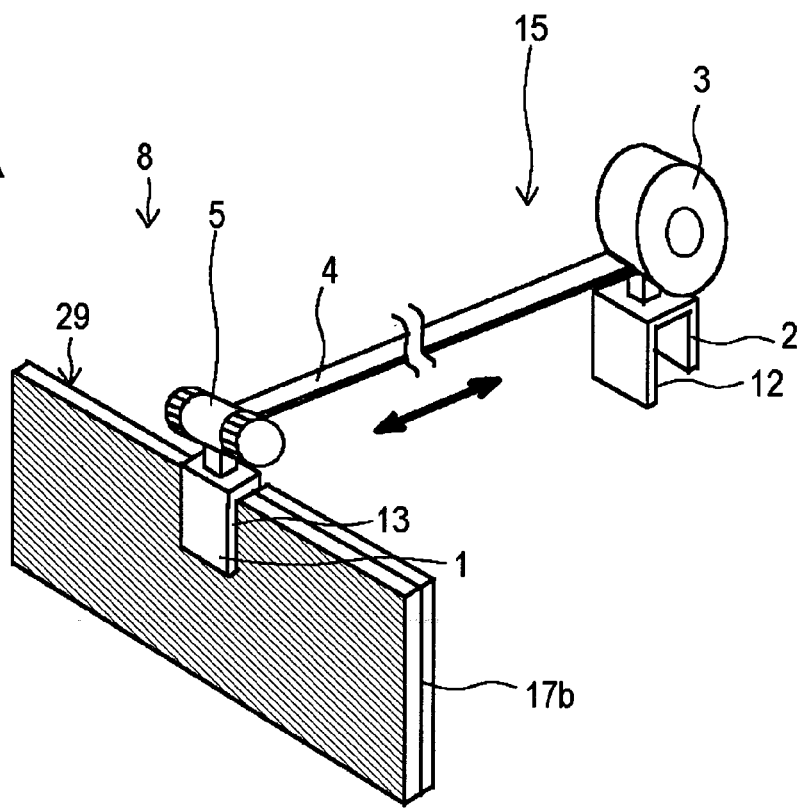
FIGS. 4A and 4B are perspective views showing another polarizing plate fixture according to another embodiment of the present invention.

Further, as shown in FIG. 4A, in addition to the angle adjustment mechanism, a tape measure type mechanism for rendering the arm part 4 to stretch in the forward/rearward direction so as to change its length freely may be provided at the position adjustment part 3. In this case, not only the distance between the polarizing plate 29 and the wavelength division plate filter 14 may be changed arbitrarily, but also the arm part 4 may be contracted as much as possible when not in use.

In other words, even if a size, a focal distance, etc. of the image display section 34 change, as shown in a bold arrow in FIG. 4A, by means of expansion and contraction of the arm part 4, the polarizing plate 29 fixed to the attachment plate part 13 can be located at the optimal distance comparatively easily with respect to the image display section 34 so as to respond to various image display sections 34, whereby the viewer may easily observe an always clear three-dimensional image.

Figure 4B:
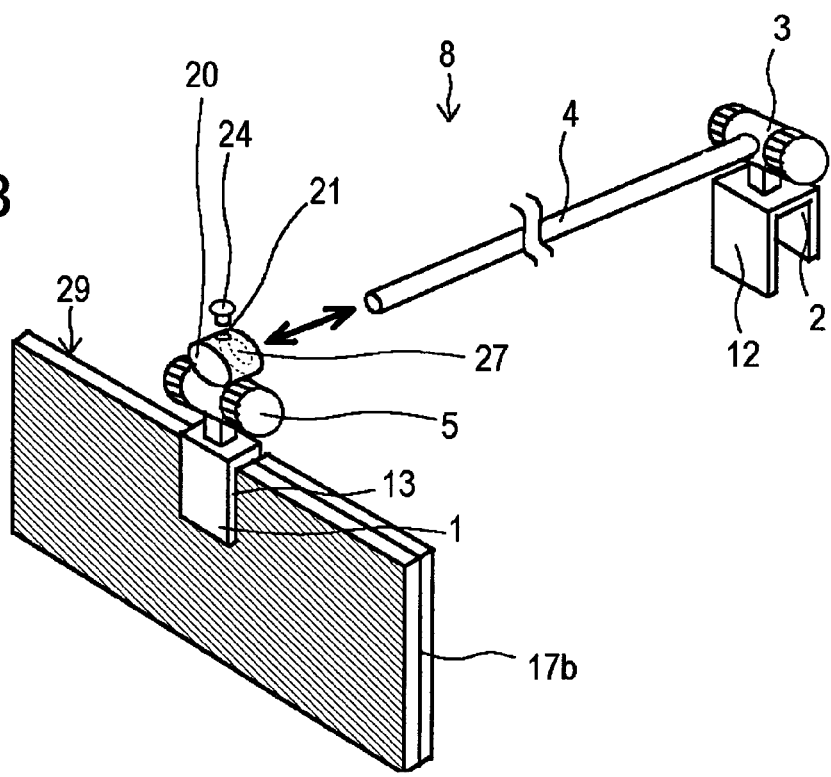

Further, as shown in FIG. 4B, the position adjustment part 5 is provided at the polarizing plate 29. The arm part 4 is constructed to be detachable from this position adjustment part. The arm part 4 may be in a round bar shape, for example, and may be attached to the attachment part 20 provided at the upper part of the position adjustment part 5.

For example, the tip of the arm part 4 is fit into a recessed attachment hole part 27 provided in the attachment part 20, and subsequently a screw 24 is fit into the screw hole part 21 provided in the upper part of this attachment part 20, whereby the tip of the arm part 4 is reliably secured to the attachment hole part 27.

In addition, the polarizing plate 29, the arm part 4, and the attachment part 2 may be unified so as to be integral and undetachable, thus preventing a possible loss of each component when stored separately.

Then, as shown in FIG. 5A, in the structure where the half wave plate 17b is provided to overlap one half part of the polarizing plate 29 as above, it is preferable that transparent protection layers 30 are coated on both surfaces of the composite body of the polarizing plate 29 and the half wave plate 17b, which provide good moisture resistance, light resistance, wear resistance, and chemical resistance and which are comparatively thick and do not have birefringence.

By means of this transparent protection layer 30, a level difference 31 corresponding to the thickness of the half wave plate which exists at the end of the half wave plate 17b (central part of the polarizing plate 29) is canceled so as to be in a flat form. Further, the polarizing plate 29 is protected from external shock, wear, etc. so as to be hardly separated and to avoid degradation by moisture absorption, etc. In addition, refraction and dispersion of light caused by the level difference 31 between the polarizing plate 29 and the half wave plate 17b may be reduced.

The material of the protection layer 30 may be of a transparent resin, such as an acrylic resin (PMMA etc.), a polycarbonate, polypropylene, etc., or of a soft and flexible rubber, such as a transparent silicone rubber. Such a protection layer may be prepared in such a way that a material in a monomer or an oligomer state is sufficiently filled up and then cured by means of ray irradiation, such as ultra-violet rays (UV), or two-part materials are mixed to be polymerized, or by evaporating solvents. It should be noted that the phase retardation plates and the polarizing plates avoid damages during the processes. Further, the method of forming the protection layer 30 may be dipping, coating, or casting; however, it is important to provide the surface flatness. An uneven surface may function as a lens, which degrades a field of view.

As shown in FIG. 5B, a transparent adhesion layer 30B is more thickly provided on a flat transparent film 30A without birefringence so as to form the transparent protection layer 30 to which the polarizing plate 29 having the half wave plate 17b may be attached. In this case, the level difference 31 of a phase retardation plate laminating edge portion is covered by the thickness of the adhesion layer 30B.

The material of the flat transparent film 30A as the protection film may be triacetyl cellulose (TAC), low birefringence polycarbonate, acrylic polymers, norbornene polymers, and vinyl ester polymers, for example. The transparent adhesion layer 30B may be of composite adhesive materials of acrylic resins, other than triacetyl cellulose. This transparent adhesion layer may be formed by casting, printing, etc., and in order to obtain the thickness, the coating material may be a UV hardening type and applied plural times.

In FIGS. 5A and 5B, as to the protection layer 30, it is preferable to cover the phase retardation plate laminating edge portion of the polarizing plate central part and the whole surface area of the phase retardation plate which is in contact with air. However, it is not necessary to provide the protection layer 30 to the opposite side of the polarizing plate to which the phase retardation plate is not laminated.

Thus, according to the embodiment, the half wave plate 17a and the half wave plate 17b that allow the polarized lights to enter respectively, which are separated by the half wave plate 17a, are provided. Since the half wave plate 17b for rotating the polarized lights in the reverse direction to that of the half wave plate 17a is provided on the image display surface side at the right eye 22R side of the polarizing plate 29, the lights that are emitted from the image display surface side pass through the half wave plate 17a, are separated, and polarized in the predetermined polarization angle direction and become the lights which enter the half wave plate 17b so as to be polarized in the reverse direction to the predetermined polarization angle direction, so that the polarization angles of the lights are cancelled by the half wave plate 17a and the half wave plate 17b. Thus, the lights are returned to the lights having a polarization angle similar to those when emitted from the image display section side. The returned lights enter the area provided with the half wave plate 17b on the image display surface side of the polarizing plate 29, or the area not provided with it, so that a clear three-dimensional image with little cross talk can be displayed.

In addition, since the polarizing plate fixture 8 is added as a holding mechanism for holding the spatial relationship between the polarizing plate 19 and the wavelength division plate filter 14, the alignment and the holding of the distance between the polarizing plate 19 and the wavelength division plate filter 14 can be performed. Thus, even if the angle of the image display section 34 changes, the respective polarized lights separated by the wavelength division plate filter 14 may be allowed to enter in the state where they are reliably separated into lights for the polarizing plate member 7R and lights for polarizing plate member 7L, whereby the viewer can observe an always clear three-dimensional image.

Since the fixture 8 for holding the spatial relationship between the polarizing plate 19 and the wavelength division plate filter 14 is added, a position adjustment operation of the polarizing plate 19 depending on the viewer may be omitted, whereby the three-dimensional image can be observed comparatively easily.

In order to effectively implement the method as described with reference to FIGS. 1A and 1B, FIGS. 6A and 6B show an example in which the structure of the present embodiment is applied to the polarizing plate fixture 8 as shown in FIGS. 2A and 2B (however, the image display section side is not illustrated).

Figure 6A:
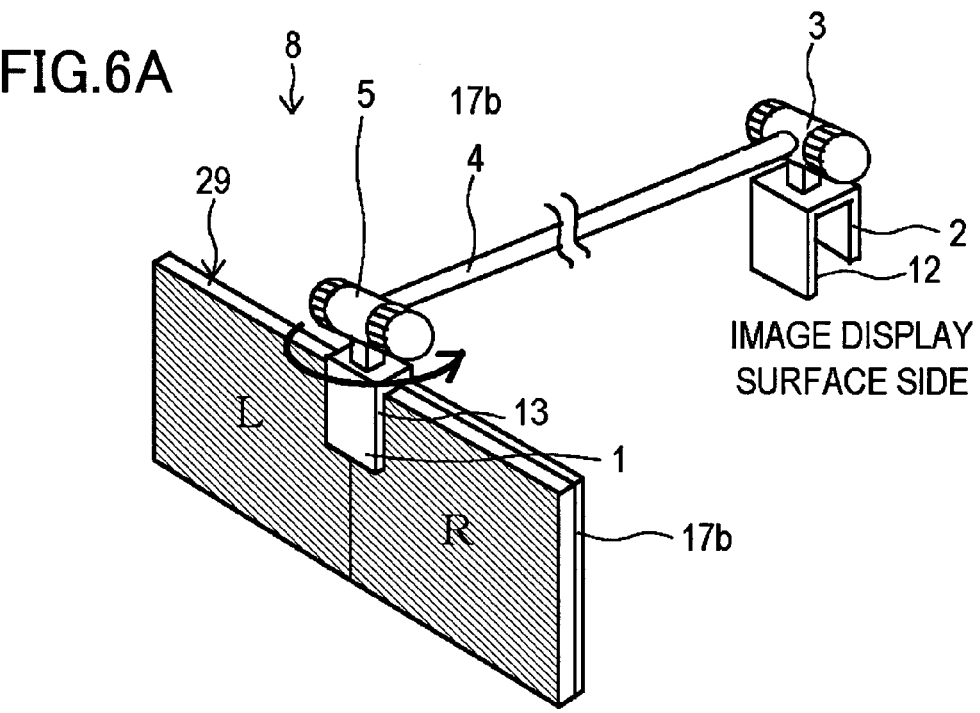
FIGS. 6A and 6B are perspective views showing a structure of the polarizing plate fixture to which the polarizing plate is fixed according to the embodiment of the present invention.
Figure 6B:
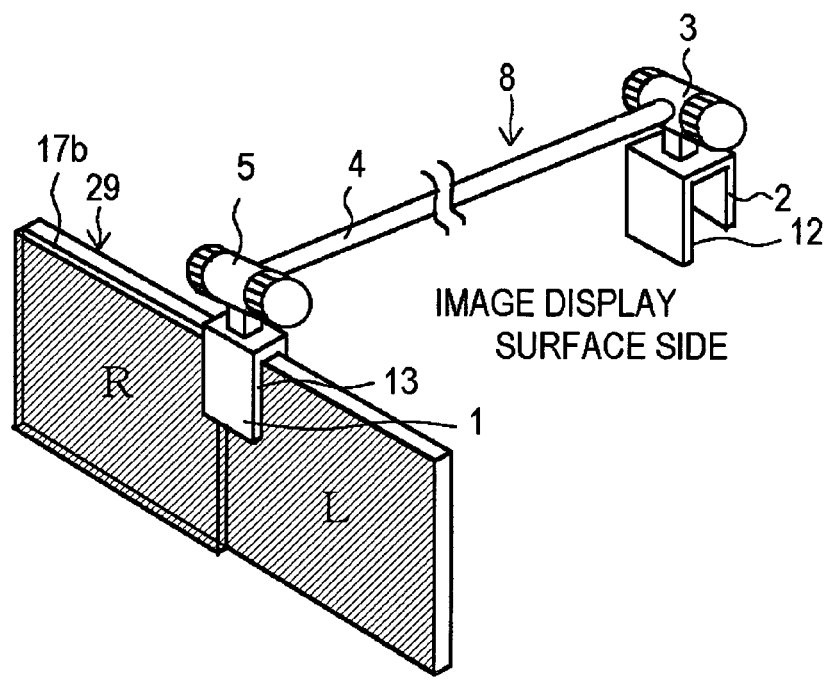

In other words, as shown in FIG. 6A, the polarizing plate 29 is fixed to the attachment plate part 13 of the polarizing plate fixture 8, and the half wave plate 17b is provided on a right-hand side polarizing plate surface toward the image display surface. Then, as shown in FIG. 6B, the polarizing plate 29 is rotated by 180 degrees so that the half wave plate 17b may be moved to the viewer's left eye side. In addition, as with the case in FIG. 1B, after adjusting the position of the half wave plate 17a, if it is reversed by 180 degrees from the states of FIG. 6B to the original state as shown in FIG. 1A or FIG. 6A, the target three-dimensional image can be observable (The same applies to the following examples).

Usually, as for a position adjustment method of a wavelength division plate filter, a pattern is displayed on a display surface in a state where one eye is closed, and wearing a pair of glasses for three-dimensional images, the position of the filter is adjusted so that the whole may be seen in red through the right eye, for example. Since closing one eye is troublesome, if the polarizing plate is disposed in a direction (direction of one filter of glasses) orthogonal to or parallel with an LCD (liquid crystal display) polarizing plate, the same image may be seen through both eyes. In this state, it is adjusted so that the whole surface may be seen in red, for example, to thereby complete the position adjustment of the filter. However, such a method needs another polarizing plate for adjustment, and its operation is not so easy, either. The method of the present embodiment as shown in FIGS. 1A, 1B, 6A and 6B may only reverse the polarizing plate 29 back to front so as to perform the position adjustment with both eyes open, whereby a means required for the adjustment may be simple and the operation becomes easy.

Now, with reference to FIG. 7, another example of the polarizing plate fixture 8 according to the embodiment will be described.

Figure 7:
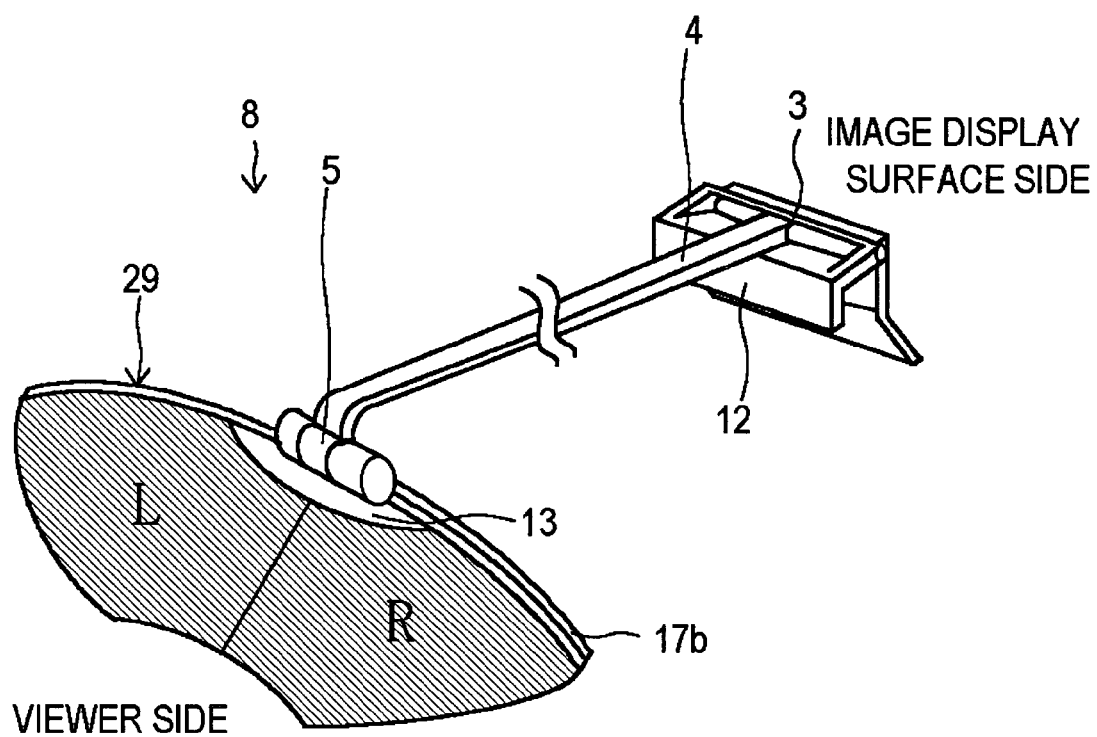
FIG. 7 is a perspective view showing a structure of another polarizing plate fixture according to another embodiment of the present invention.

The polarizing plate fixture 8 as shown in FIG. 7 has a structure similar to that shown in FIGS. 6A and 6B. At one end, a sector-shaped polarizing plate 29 is detachably fixed to an arc-shaped attachment plate part 13 of a clip type, and at the other end it is detachably fixed to the frame section of an image display section by means of a clip type attachment plate part 12.

In this example, since the clip mechanism is used for a position adjustment part 5 and a position adjustment part 3, they are comparatively easily mounted to a polarizing plate 29 or an image display surface. In addition, the form of the polarizing plate 29 is made more sophisticated.

Figure 8A:
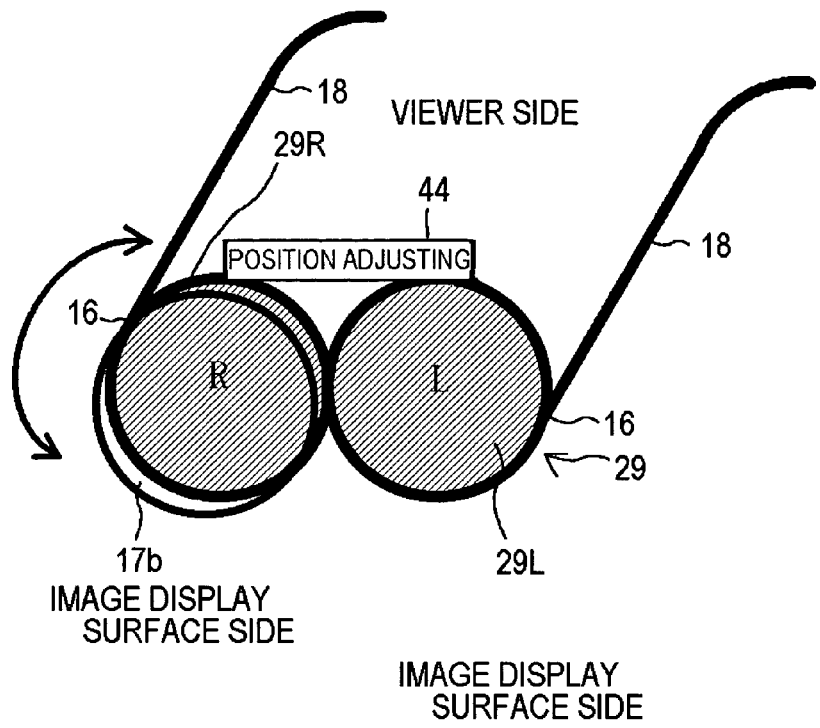
FIGS. 8A and 8B are perspective views showing a structure of a pair of polarized glasses according to another embodiment of the present invention.
Figure 8B:
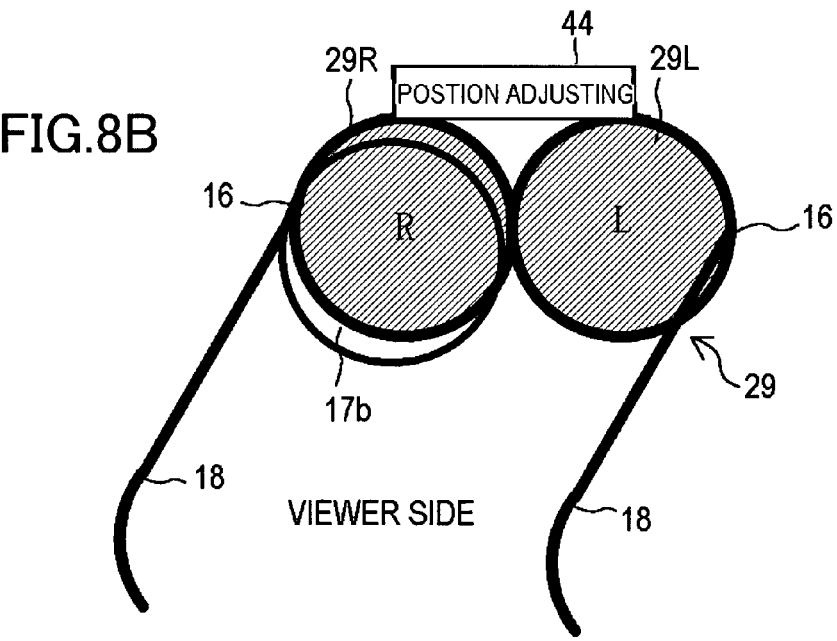

FIGS. 8A and 8B show polarized glasses 29 to which the structure according to the embodiment is applied.

The polarized glasses 29 of FIG. 8A have polarizing plates 29L and 29R with the same polarization angle in front of a pair of side frames 18. The half wave plate 17b is provided in front of one polarizing plate 29R. The side frame 18 is rendered turnable in the forward/rearward direction by means of the hinge section 16. Bridging respective tops of the polarizing plates 29L and 29R, a confirmation plate 44 saying "position adjusting", for example, is provided. When the viewer wears the polarizing plate 29 as a pair of polarized glasses, it may be easily determined whether the half wave plate 17b is located at the left eye or the right eye.

When the image display section is observed using the polarized glasses 29 in the state as shown in FIG. 8A, it is possible to observe the three-dimensional image as shown in FIG. 1A. When in the state of FIG. 8A, if the side frames 18 are horizontally turned by 180 degrees, as indicated by an arc-shaped arrow, the glasses are rendered substantially in the state of FIG. 1B. For the above reasons, it is possible to adjust the position of the half wave plate 17a (or the wavelength division plate filter 14) easily.

Now, other examples of the polarizing plate fixture 8 according to the embodiment will be described with reference to FIG. 9 to FIG. 17.

Figure 9A:
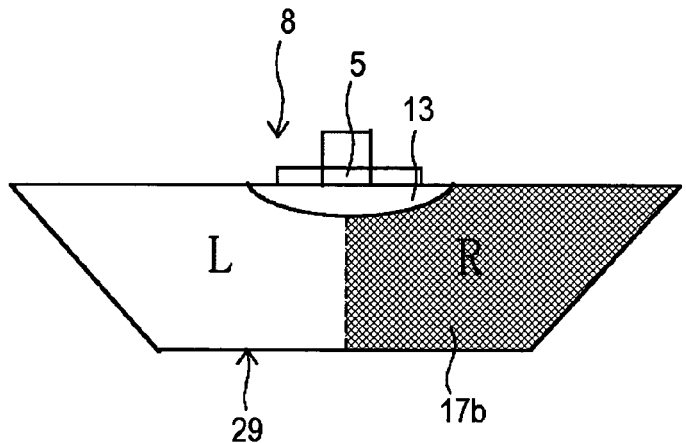
FIGS. 9A, 9B, 9C and 9D are elevational views showing an adjustment situation of another polarizing plate according to another embodiment of the present invention.

A polarizing plate fixture 8, as shown in FIG. 9A, is for fixing an inverted trapezium-like polarizing plate 29 (however, the polarization direction of the polarizing plate 29 is similar to that of FIG. 7, and the illustration is omitted; The same applies to the following examples). As for the polarizing plate 29, the half wave plate 17b is provided on the image display surface side, from the center to the right eye side, and a center top end of the polarizing plate 29 is attached to the attachment plate part 13 of the clip type of the position adjustment part 5.

Figure 9B:
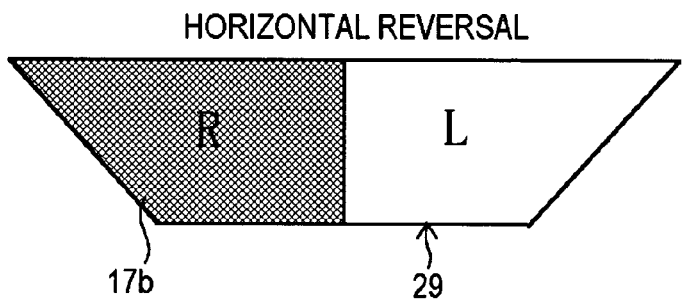

As shown in FIG. 9B, when the right and left are reversed by means of a rotating mechanism (not shown) of the position adjustment part, a situation substantially the same as that in FIG. 6B is obtained. For the above reasons, it is possible to adjust the position of the half wave plate 17a (or the wavelength division plate filter 14) easily.

Figure 9C:
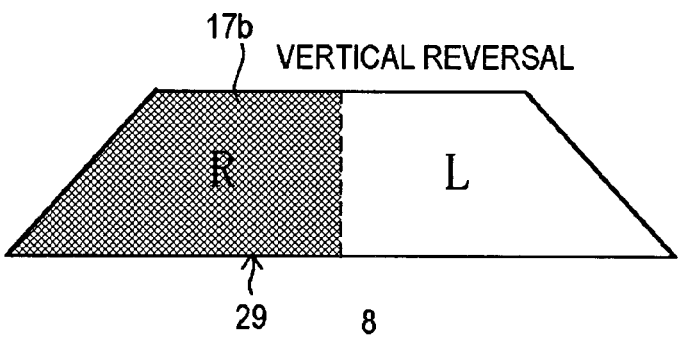
Figure 9D:
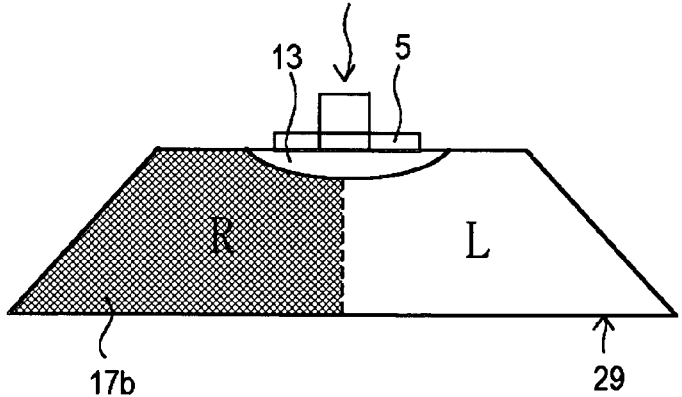

In addition, the polarizing plate 29 is removed from the clip mechanism of the position adjustment part 5. As shown in FIG. 9C, the polarizing plate 6 is rotated (reversed) in the upward/downward direction by 180 degrees. Further, as shown in FIG. 9D, the polarizing plate 29 in this state is again attached to the clip mechanism of the position adjustment part 5.

As a result, a state where the right and left in the state of FIG. 6A are reversed is obtained. In the case of receiving images where the positions of the left and right eyes are displayed conversely, or in case the spatial relationship between a filter and an image has been already determined but the right and left are reversed and incorrect, etc., the positions of the left and right eyes may be reversed so as to observe the images correctly.

Figure 10A:
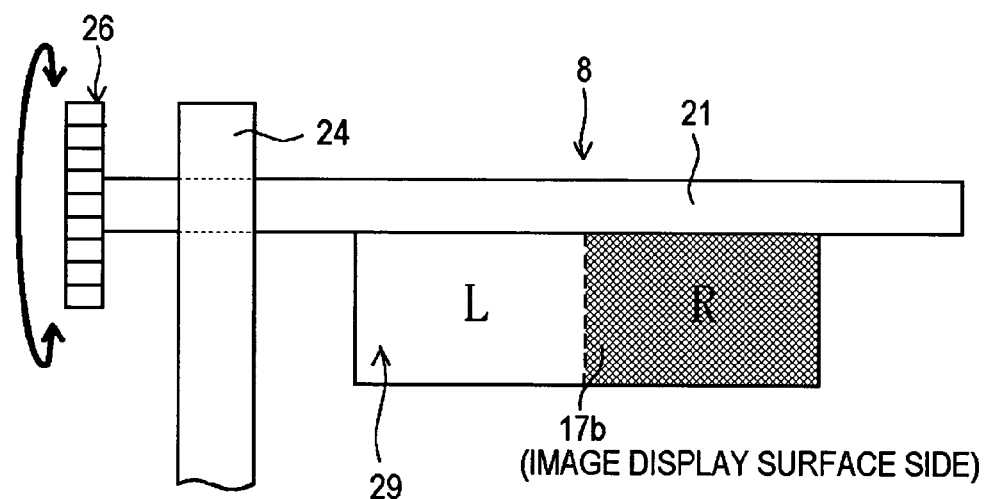
FIGS. 10A and 10B are elevational views showing an adjustment situation of another polarizing plate according to another embodiment of the present invention.

The polarizing plate fixture 8 as shown in FIG. 10A is provided with an axial part 21 penetrating a support bar section 24. A position adjustment part 26 is provided at one end of the axial part 21. The polarizing plate 29 is attached to the other end. As the position adjustment part 26 turns, the axial part 21 is turned by 180 degrees in the upward direction, as indicated by an arc-shaped arrow.

Figure 10B:
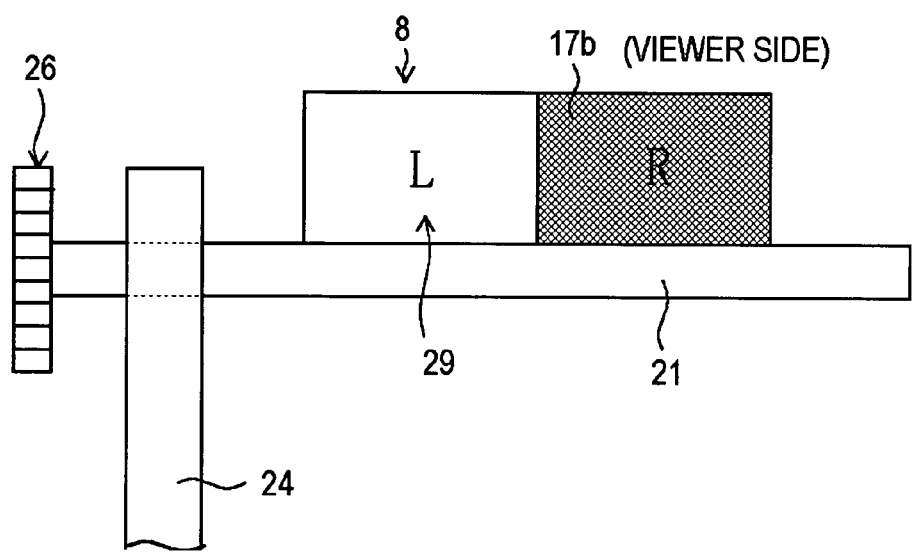

Consequently, as shown in FIG. 10B, the polarizing plate 29 is moved to an upper part of the axial part 21, and the half wave plate 17b is disposed on the viewer's right eye side.

This state is similar to that of FIG. 6B, except that the half wave plate 17b is located only in the right eye side before and after the rotation.

In addition, although the illustration is omitted, in the case of FIG. 10A, a label "viewing" may be attached to the position adjustment part 26. In the case of FIG. 10B, a label "position adjusting" may be used (similarly applied to other examples).

Figure 11A:
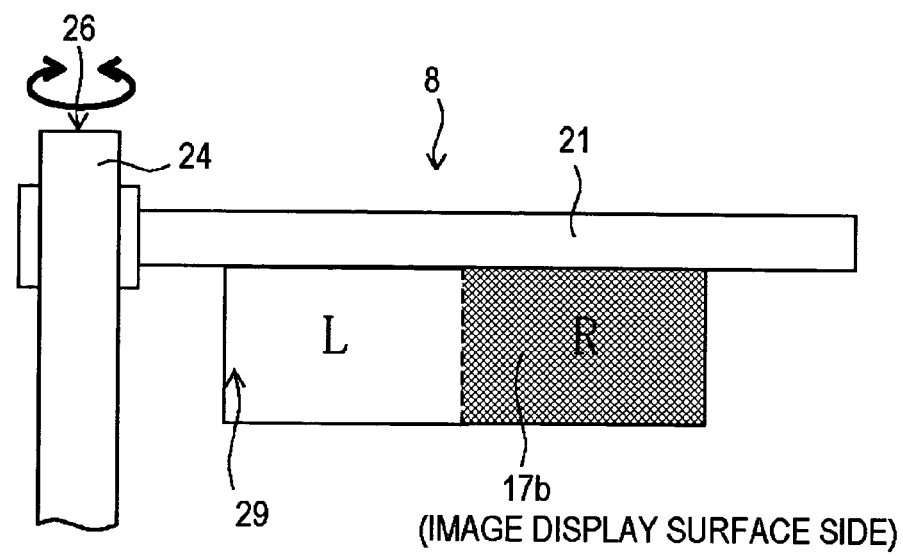
FIGS. 11A and 11B are elevational views showing an adjustment situation of another polarizing plate according to another embodiment of the present invention.
Figure 11B:
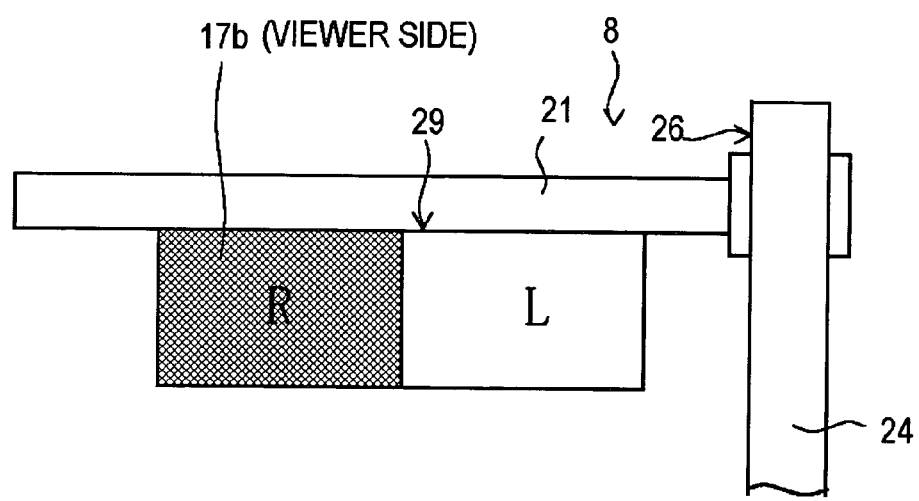

A polarizing plate fixture 8 shown in FIG. 11A is provided with an axial part 21 penetrating a support bar section 24 which becomes a position adjustment part 26 similar to that in FIG. 10A. The axial part 21 is turned about the support bar section 24 in the left/right direction by 180 degrees.

Consequently, as shown in FIG. 1B, a polarizing plate 29 is disposed on the left-hand side of the support bar section 24 and a half wave plate 17b is disposed at the left eye side, which is similar to FIG. 6B except for the position of the polarizing plate 29.

Figure 12A:
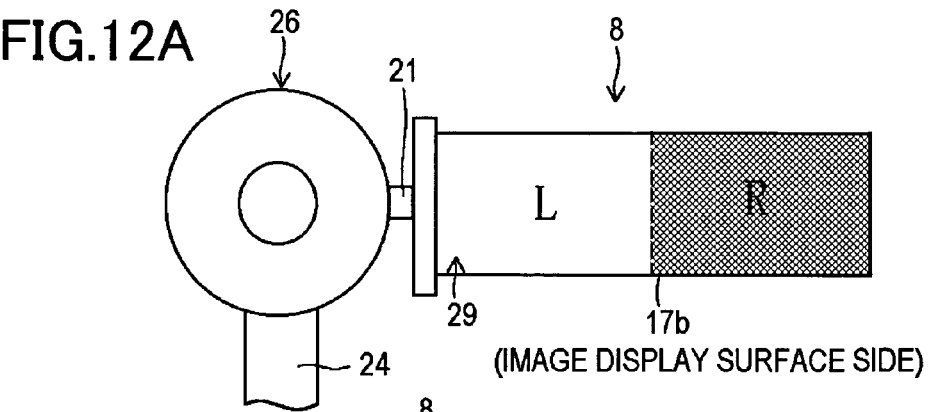
FIGS. 12A, 12B and 12C are elevational views showing an adjustment situation of another polarizing plate according to another embodiment of the present invention.

As to a polarizing plate fixture 8 as shown in FIG. 12A, a polarizing plate 29 is attached via an axial part 21 to the position adjustment part 26 that is provided at an upper end of a support bar section 24 and is turnable in the upward/downward direction. A half wave plate 17b is provided at the right eye side from the center of the polarizing plate 29.

Figure 12B:
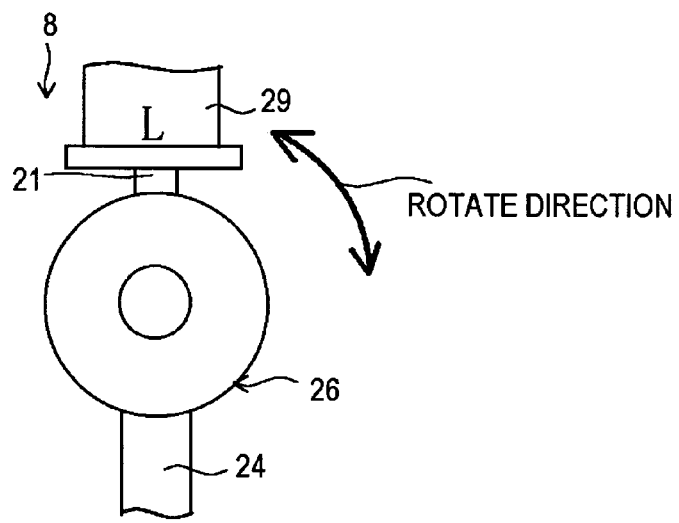
Figure 12C:
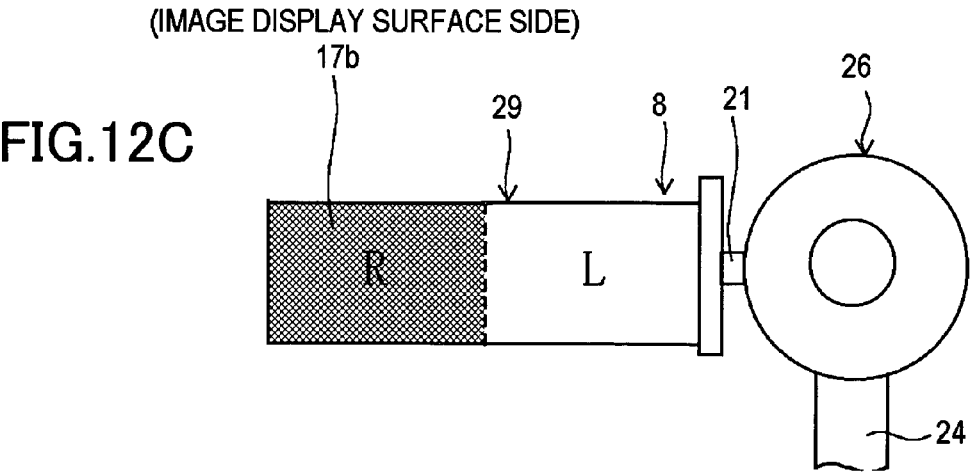

As shown in FIG. 12B, the polarizing plate 29 is turned upwardly or downwardly about the position adjustment part 26, as indicated by an arc-shaped arrow, so as to be turned by 180 degrees, as shown in FIG. 12C, and disposed on the left-hand side of support bar section 24, to change thereby the state of FIG. 6A into a state where the right and left are reversed. In the case of receiving the images where the positions of the left and right eyes are displayed conversely, or in case the spatial relationship between the filter and the image has been already determined but the right and left are reversed and incorrect, etc., the positions of the left and right eyes may be reversed so as to observe the images correctly.

Figure 13A:
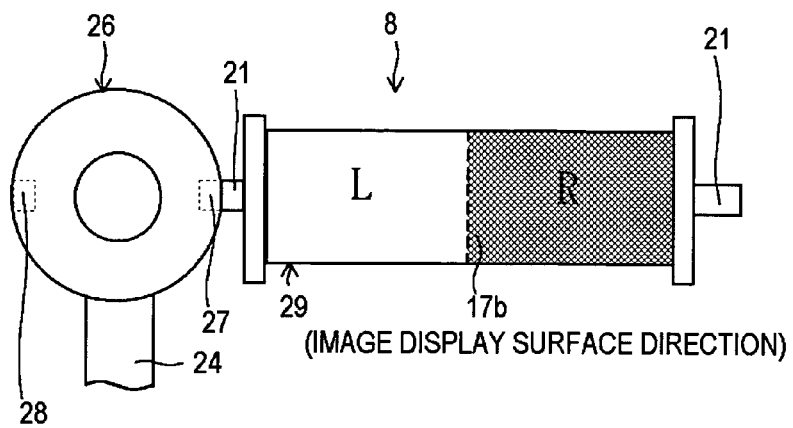
FIGS. 13 A, 13B and 13C are elevational views showing an adjustment situation of another polarizing plate according to another embodiment of the present invention.

As to a polarizing plate fixture 8 as shown in FIG. 13A and a position adjustment part 26 provided at a support bar section 24, a polarizing plate 29 is attached via an axial part 21 to an attachment part 27 provided on the right hand side end of the position adjustment part 26.

Figure 13B:
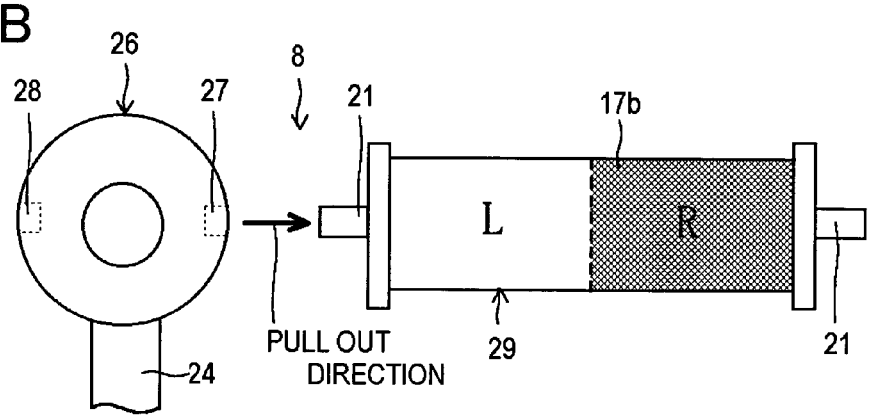
Figure 13C:
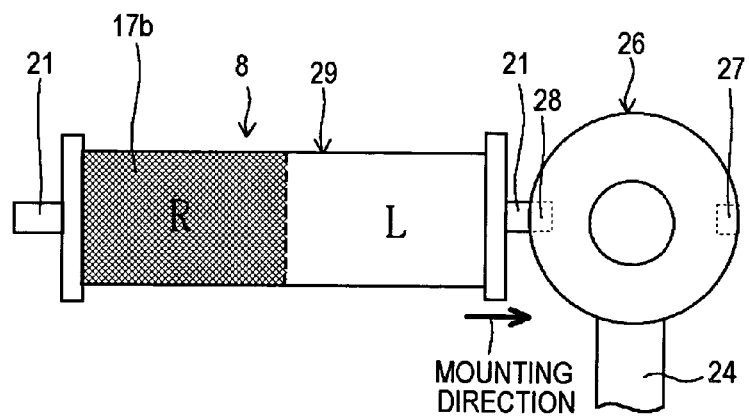

As shown in FIG. 13B, after pulling out and removing the polarizing plate 29 to the right-hand side from an attachment part 27 of the position adjustment part 26, the left and right of the polarizing plate 29 are reversed, as shown in FIG. 13C, so as to insert and fix the axial part 21 in the attachment part 28, which is in a position opposite to the attachment part 27 of the position adjustment part 26, whereby a half wave plate 17b is disposed on an image display surface side for the left eye of the polarizing plate 29 so as to change into a state where the left and right of the state of FIG. 6A are reversed.

Figure 14A:
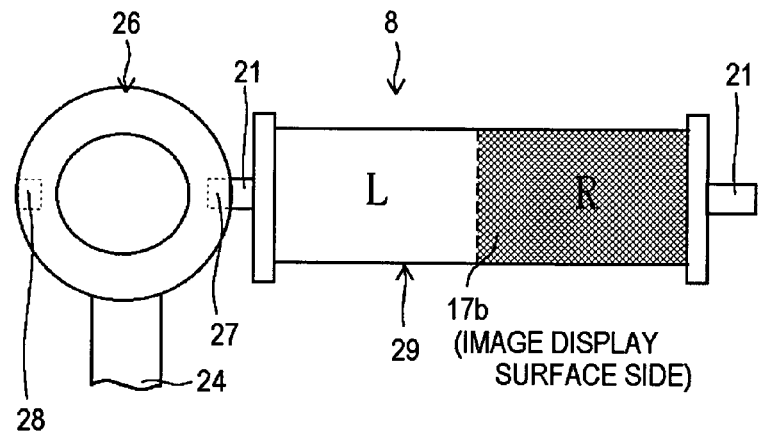
FIGS. 14A, 14B and 14C are elevational views showing an adjustment situation of another polarizing plate according to another embodiment of the present invention.
Figure 14B:
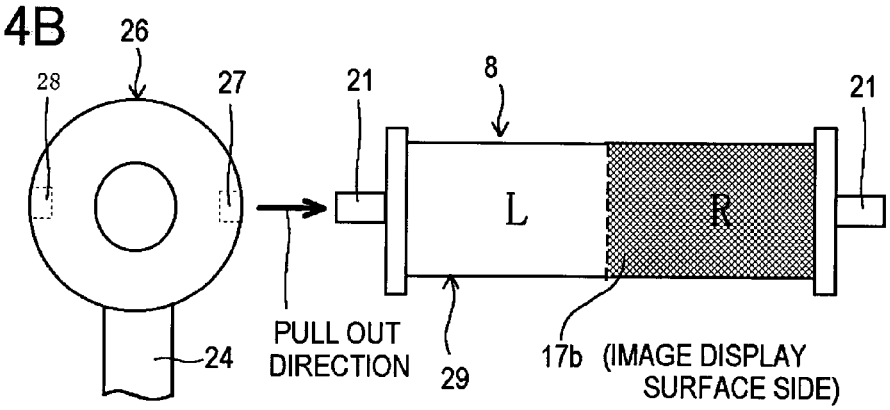
Figure 14C:
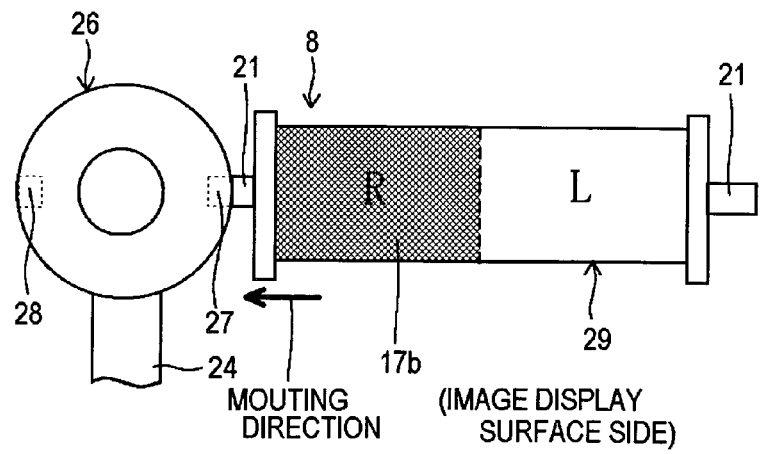

A polarizing plate fixture 8 as shown in FIG. 14A has a construction similar to that of FIG. 13A; however, as shown in FIG. 14B, after pulling out a polarizing plate 29 from an attachment part 27 of a position adjustment part 26, the right and left are reversed, then an axial part 21 of the polarizing plate 29 is inserted and fixed in the original attachment part 27 of the position adjustment part 26 as shown in FIG. 14C. Thus, a half wave plate 17b is disposed at the left eye side of the polarizing plate 29 without changing the position of the polarizing plate 29.

Figure 15A:
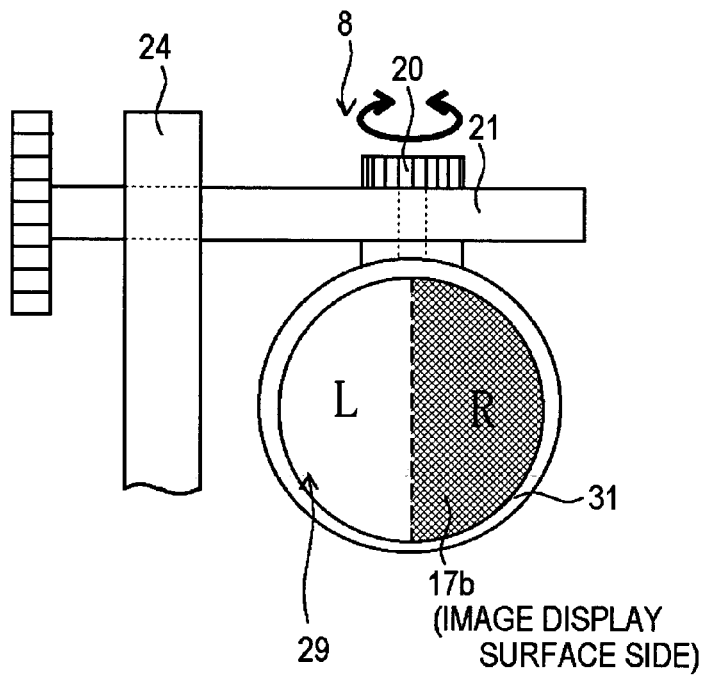
FIGS. 15A and 15B are elevational views showing an adjustment situation of another polarizing plate according to another embodiment of the present invention.

A polarizing plate fixture 8 as shown in FIG. 15A has an axial part 21 provided at a turnable support bar section 24, a position adjustment part 20 provided at the axial part 21, and a circular polarizing plate 29 held at a frame section 31 turned by the position adjustment part 20. A half wave plate 17b is provided at the right hand side semicircle portion on an image display surface side of the polarizing plate 29.

The polarizing plate 29 is turned with respect to the position adjustment section 20 by 180 degrees in the left/right direction so as to dispose the half wave plate 17b at the viewer's left eye side semicircle portion of the polarizing plate 29, as shown in FIG. 151B, and change into a state similar to that of FIG. 6B.

Figure 16A:
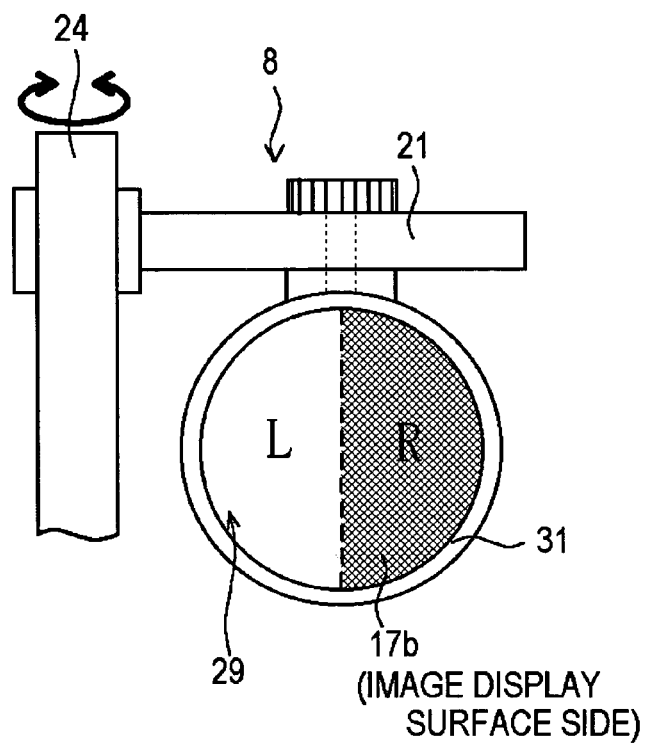
FIGS. 16A and 16B are elevational views showing an adjustment situation of another polarizing plate according to another embodiment of the present invention.

As to a polarizing plate fixture 8 as shown in FIG. 16A, the frame section 31 holding a circular polarizing plate 29 is fixed in an axial part 21 turnably provided at the support bar section 24. A half wave plate 17b is provided at the right-hand side semicircle portion on an image display surface side of the polarizing plate 29.

Figure 16B:
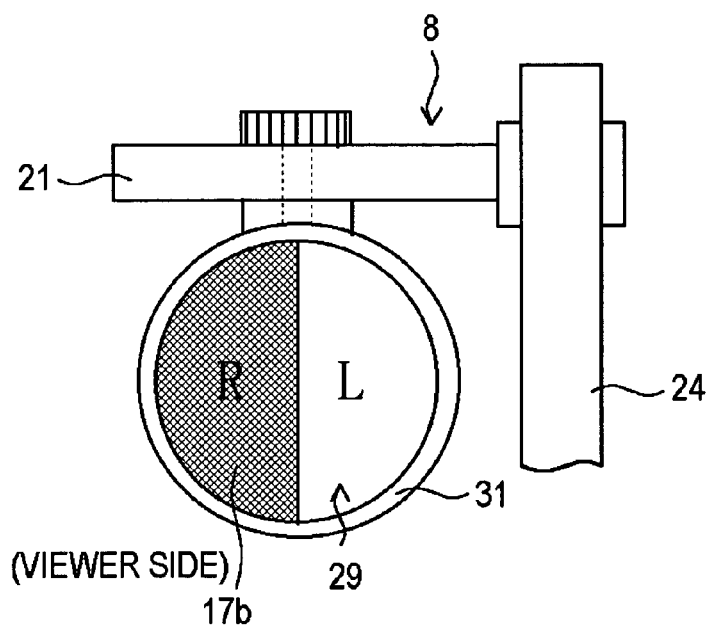

The polarizing plate 29, together with the axial part 21, is turned with respect to the support bar section 24 in the left/right direction by 180 degrees, and as shown in FIG. 16B, the half wave plate 17b is disposed at the viewer's left eye side of the polarizing plate 29, so as to change into a state similar to that of FIG. 6B except that the positions of the polarizing plate 29 differ from those of FIG. 6B.

Figure 15B:
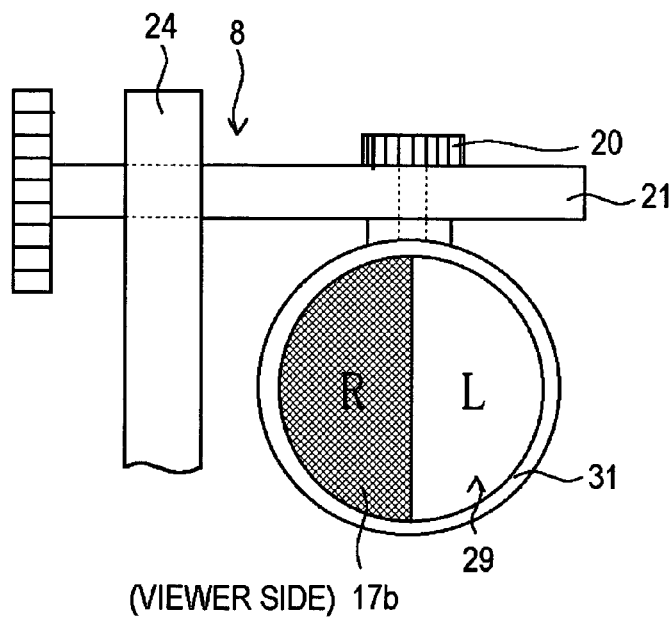
Figure 17A:
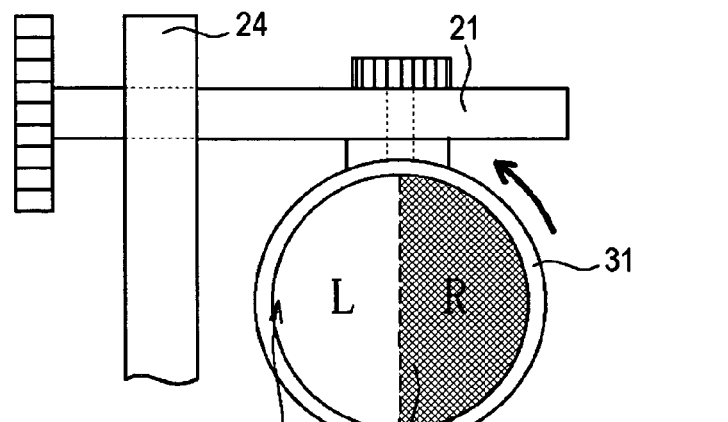
FIGS. 17A, 17B, and 17C are elevational views showing an adjustment situation of another polarizing plate according to another embodiment of the present invention.

Further, a polarizing plate fixture 8 shown in FIG. 17A has a construction similar to that of FIG. 15, and a circular polarizing plate 29 may slide within a frame section 31 so as to be turned.

Figure 17B:
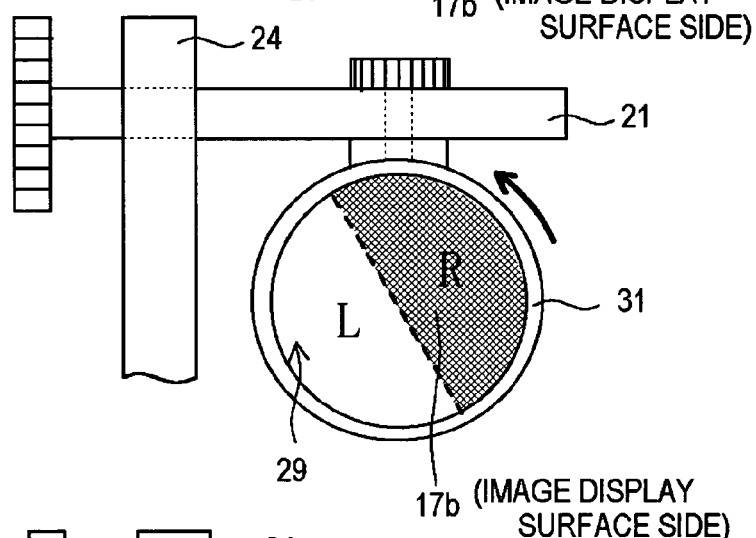
Figure 17C:
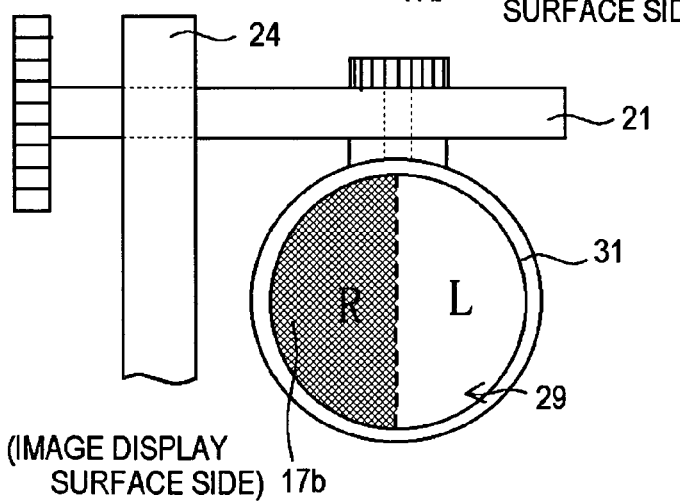

Therefore, the polarizing plate 29 is turned in a direction as indicated by an arc-shaped arrow to a position of FIG. 17B and further to a position of FIG. 17C, so as to be in a state where a half wave plate 17b is inclined toward the left of the polarizing plate 29, and further it is disposed in the semicircle portion at the left eye side, thus changing the half wave plate 17b into an arbitrary inclination state or a state where the left and right are reversed.

Like each example described above, if the mechanism in which the polarizing plate 29 can be rotated, or the mechanism which can reverse its back and front, in addition to the above, in the case of receiving images where the positions of the left and right eyes are displayed conversely, or in the case where the spatial relationship between the filter and the image has been already determined but the right and left are reversed and incorrect, etc., the positions of the left and right eyes may be reversed so as to observe the images normally.

Thus, according to the embodiment, the half wave plate 17a and the half wave plate 17b that allow the polarized lights to enter respectively, which are separated by the half wave plate 17a, are provided. Since the half wave plate 17b for rotating the polarized lights in the reverse direction to that of the half wave plate 17a is provided on the image display surface side at the right eye 22R side of the polarizing plate 29, the lights that are emitted from the image display surface side pass through the half wave plate 17a, are separated, and polarized in the predetermined polarization angle direction and become the lights which enter the half wave plate 17b so as to be polarized in the reverse direction to the predetermined polarization angle direction, so that the polarization angles of the lights are cancelled by the half wave plate 17a and the half wave plate 17b. Thus, the lights are returned to the lights having a polarization angle similar to those when emitted from the image display section side. The returned lights enter the area provided with the half wave plate 17b on the image display surface side of the polarizing plate 29, or the area not provided with it, so that a clear three-dimensional image with little cross talk can be displayed.

In addition, since the polarizing plate fixture 8 is added as the holding mechanism for holding the spatial relationship between the polarizing plate 19 and the wavelength division plate filter 14, the alignment and the holding of the distance between the polarizing plate 19 and the wavelength division plate filter 14 can be performed. Thus, even if the angle of the image display section 34 changes, the respective polarized lights separated by the wavelength division plate filter 14 may be allowed to enter in the state where they are reliably separated into lights for the polarizing plate member 7R and lights for polarizing plate member 7L, whereby the viewer can observe an always clear three-dimensional image.

The embodiments as described above may be further altered based on the technical ideas of the present invention.

For example, sizes, shapes, structures, materials, attachment positions, quantities, etc. of the half wave plate 17a, the half wave plate 17b, the attachment part 20, the polarizing plate 19, 29, the position adjustment part 3, 5 and the arm part 4 may be arbitrarily chosen. Further, the adjustment angle either in the forward/rearward direction, the right/left direction, or the upward/downward direction for the attachment part 20 and the position adjustment part 3, 5 and the attachment position of the fixture 8 with respect to the frame section 35 may be changed arbitrarily.

The polarizing plate fixture 8 may be mounted on not only the notebook computer 10 with the movable image display section but also a desk top computer, a television receiver, or a screen of a projector. As far as the operations and effects as described above can be maintained, the polarizing plate fixture 8 may be attached to another place, such as a desk, other than the image display section. The polarizing plate fixture 8 may be detachable from the image display section, etc. by means of the attachment structure as described above or may remain fixed.

Further, the polarizing plate 19 may be removed from the fixture 8 so as to be accommodated in a PC card inlet (slot) 47, etc. of the notebook computer 10 as shown in FIGS. 2. When not in use, the polarizing plate 19 may be turned to the arm part 4 side, and also the arm part 4 may be accommodated in an accommodation part (not shown) formed in the frame section 35.

The position adjustment operation of the position adjustment parts 3 and 5 of the polarizing plate fixture 8 and the stretching operation of the arm part 4, etc. may be manually performed; however, they may be carried out by means of a motor drive, etc. mechanically and automatically, for example.

Although, examples employing the liquid crystal panel part 9 as an image display section have been described, alternatively, various image display apparatuses, such as a light emitting element array display device, an organic electroluminesense display device, a cathode-ray tube, and a plasma display device may be employed.

In the above examples, the wavelength division plate has the structure horizontally prolonged for every other line, however, the length direction of the wavelength division plate may correspond to the pattern of the pixel parts so as to be not only in a horizontal direction but also in the perpendicular direction or an oblique direction. Corresponding to the pattern of the pixel parts, the wavelength division plate may not be linear but may be dot-shaped or island-shaped. In addition to forming the wavelength division plate on a surface at the liquid crystal panel part 9 side of a transparent support substrate, it may be formed on a surface at the viewer's side.

In the above examples, the position adjustment part 5, etc. for changing positions of the polarization means of polarizing plate 19, etc. by turning, etc. are provided at the arm part 4 of the fixture 8; however, it may be provided on the polarization means side so that the arm part 4 is connected there to.

Finally, the embodiments and examples described above are only examples of the present invention. It should be noted that the present invention is not restricted only to such embodiments and examples, and various modifications, combinations and sub-combinations in accordance with its design or the like may be made without departing from the scope of the present invention.

What is claimed is:

1. Polarization means used for a three-dimensional image display apparatus, said three-dimensional image display apparatus comprising:

an image display section for displaying image information corresponding to parallax in a first region and a second region; and a first phase retardation plate which is provided facing at least said first region of said image display section and which rotates a polarization direction of a polarized light of said image information from said first region in a direction different from a polarization direction of a polarized light of said image information from said second region;

said polarization means comprising:

a first area which allows said polarized light of said image information from said first region, the polarization direction of which is rotated to enter;

a second area which allows said polarized light of said image information from said second region to enter; and a second phase retardation plate for rotating the polarized light of said image information from said second region in a direction opposite to that of said first phase retardation phase, said second phase retardation plate being provided in said second area on the image display section side.

2. The polarization means according to claim 1, wherein said first phase retardation plate and said second phase retardation plate are respectively made of half wave plates.

3. The polarization means according to claim 1, wherein at least a portion where said second phase retardation plate is located is coated with a transparent protection material.

4. The polarization means according to claim 1, wherein said second phase retardation plate is capable of rotating in a horizontal direction so as to be moved and placed in said first area.

5. The polarization means according to claim 1, wherein said polarization means is held by a position holding means for holding a distance and parallelism between said first phase retardation plate and said polarization means, and for aligning the center of said first phase retardation plate with said polarization means.

6. The polarization means according to claim 5, wherein said polarization means is attached so as to be detachable or undetachable from said position holding means, or wherein said position holding means is attached so as to be detachable or undetachable.

7. The polarization means according to claim 5, wherein said polarization means is held at one end of an arm part of said position holding mechanism fixed to a frame section of said image display section.

8. The polarization means according to claim 5, wherein position adjustment of said polarization means is carried out by a click type position adjustment means.

9. The polarization means according to claim 7, wherein the other end of said arm part is fixed to said frame section of said image display section through the click type position adjustment means.

10. The polarization means according to claim 6, wherein said polarization means is position-changeable in the forward/rearward direction and/or in the left/right direction.

11. The polarization means according to claim 10, wherein said polarization means is turnable with respect to said first phase retardation plate in the forward/rearward direction and/or in the left/right direction.

12. The polarization means according to claim 7, wherein said arm part is stretchable in the forward/rearward direction.

13. The polarization means according to claim 1, wherein said image display section is arranged to be adjustable in angle.

14. The polarization means according to claim 1, wherein said polarization means is held and fixed in front of a viewer, and said first area and said second area are respectively located at the left eye and the right eye of said viewer.

15. The polarization means according to claim 14, wherein said polarization means is provided as a pair of polarized glasses.

16. The polarization means according to claim 14, wherein said polarization means is reversed back to front with respect to said viewer by altering position of a holding and fixing section with respect to said viewer.

17. A position holding mechanism for polarization means used for a three-dimensional image display apparatus, said three-dimensional image display apparatus comprising:

an image display section for displaying image information corresponding to parallax in a first region and a second region; and a first phase retardation plate which is provided facing at least said first region of said image display section and which rotates a polarization direction of a polarized light of said image information from said first region in a direction different from a polarization direction of a polarized light of said image information from said second region;

said polarization means comprising:

a first area which allows said polarized light of said information from said first region, the polarization direction of which is rotated, to enter;

a second area which allows said polarized light of said image information from said second region to enter; and a second phase retardation plate for rotating the polarized light of said image information from said a second region in a direction opposite of that of said first phase retardation plate, said second phase retardation plate being provided in said second area on the image display section side, said position holding mechanism comprising:

position holding means for holding said polarization means at one end, holding a distance and parallelism between said polarization means and said first phase retardation plate, and aligning them.

18. The position holding mechanism for the polarization means according to claim 17, wherein said first phase retardation plate and said second phase retardation plate are respectively made of the half wave plates, and said respective polarized lights separated by said first phase retardation plate are entered through or not through said second phase retardation plate into said first area and said second area respectively.

19. The position holding mechanism for the polarization means according to claim 17, wherein at least a portion where said second phase retardation plate is located in said polarization means is coated with a transparent protection material.

20. The position holding mechanism for the polarization means according to claim 17, wherein said second phase retardation plate is capable of rotating in horizontal direction so as to be moved and placed in said first area.

21. The position holding mechanism for the polarization means according to claim 17, wherein said polarization means is attached so as to be detachable or undetachable from said position holding means, or wherein said position holding means is attached so as to be detachable or undetachable.

22. The position holding mechanism having a polarizing plate according to claim 17, wherein said polarization means is held at one end of an arm part of said position holding mechanism fixed to a frame section of said image display section.

23. The position holding mechanism for the polarization means according to claim 17, wherein position adjustment of said polarization means is carried out by a click type position adjustment means.

24. The position holding mechanism for the polarization means according to claim 22, wherein the other end of said arm part is fixed to said frame section of said image display section through the click type position adjustment means.

25. The position holding mechanism for the polarization means according to claim 17, wherein said polarization means is position-changeable in the forward/rearward direction and/or in the left/right direction.

26. The position holding mechanism for the polarization means according to claim 25, wherein said polarization means is turnable with respect to said first phase retardation plate in the forward/rearward direction and/or in the left/right direction.

27. The position holding mechanism for the polarization means according to claim 22, wherein said arm part is stretchable in the forward/rearward direction.

28. The position holding mechanism for the polarization means according to claim 17, wherein said polarization means is held and fixed in front of a viewer and said first area and said second area are respectively located at the left eye and the right eye of said viewer.

29. The position holding mechanism for the polarization means according to claim 28, wherein said polarization means is provided as a polarizing plate.

30. The position holding mechanism for the polarization means according to claim 28, wherein said polarization means are reversed back to front with respect to said viewer by altering position of a holding and fixing section with respect to said viewer.

* * * * *